United States Patent
Tange et al.

(10) Patent No.: US 11,294,339 B2
(45) Date of Patent: Apr. 5, 2022

(54) CONTROL DEVICE, CONTROL METHOD, AND NON-TRANSITORY RECORDING MEDIUM

(71) Applicant: FUJI ELECTRIC CO., LTD., Kanagawa (JP)

(72) Inventors: Yoshio Tange, Tokyo (JP); Satoshi Kiryu, Tokyo (JP)

(73) Assignee: FUJI ELECTRIC CO., LTD., Kawasaki (JP)

(*) Notice: Subject to any disclaimer, the term of this patent is extended or adjusted under 35 U.S.C. 154(b) by 409 days.

(21) Appl. No.: 16/665,125

(22) Filed: Oct. 28, 2019

(65) Prior Publication Data

US 2020/0183338 A1 Jun. 11, 2020

(30) Foreign Application Priority Data

Dec. 10, 2018 (JP) .............................. JP2018-231177

(51) Int. Cl.
| | |
|---|---|
| G06F 1/00 | (2006.01) |
| G05B 13/02 | (2006.01) |
| G06N 3/04 | (2006.01) |
| G05B 13/04 | (2006.01) |

(52) U.S. Cl.
CPC ......... *G05B 13/027* (2013.01); *G05B 13/048* (2013.01); *G06N 3/04* (2013.01)

(58) Field of Classification Search
CPC .... G05B 13/027; G05B 13/048; G06N 3/088; G06N 3/04; G06N 3/006; F02D 19/025; F02D 41/22; F02D 19/0623
See application file for complete search history.

(56) References Cited

U.S. PATENT DOCUMENTS

| | | | |
|---|---|---|---|
| 10,065,654 B2 | 9/2018 | Nishi | |
| 2005/0139193 A1* | 6/2005 | Kobayashi | F02D 41/1458 123/350 |
| 2010/0100217 A1* | 4/2010 | Bandoh | C30B 15/20 700/104 |
| 2011/0083808 A1* | 4/2011 | Kagoshima | H01J 37/32926 156/345.24 |

(Continued)

FOREIGN PATENT DOCUMENTS

| | | |
|---|---|---|
| JP | 2017-157112 | 9/2017 |
| JP | 2018-037064 | 3/2018 |

(Continued)

*Primary Examiner* — John Kwon
(74) *Attorney, Agent, or Firm* — IPUSA, PLLC

(57) ABSTRACT

There is provision of a control device for outputting an operation amount of a controlled object so as to cause a process value of the controlled object to track a target value. The control device acquires a look-ahead target value within a time series of target values; calculates a look-ahead target value deviation which is a difference between the look-ahead target value and a current process value of the controlled object; calculates an adjusted target value deviation, by calculating a difference between the look-ahead target value and a predicted value of the process value after a look-ahead time length, based on a response model of the controlled object and past change amounts of the operation amount; performs reinforcement learning based on the adjusted target value deviation; and calculates an updated operation amount based on the adjusted target value deviation.

10 Claims, 20 Drawing Sheets

(56) References Cited

U.S. PATENT DOCUMENTS

| | | | |
|---|---|---|---|
| 2016/0063142 A1* | 3/2016 | Tange | G06F 17/18 703/2 |
| 2017/0030274 A1* | 2/2017 | Nakanishi | F01P 11/16 |
| 2017/0255177 A1 | 9/2017 | Tokuda et al. | |
| 2018/0262010 A1* | 9/2018 | Kato | H02J 3/24 |
| 2020/0101649 A1* | 4/2020 | Okubo | G05B 13/0265 |

FOREIGN PATENT DOCUMENTS

| | | |
|---|---|---|
| JP | 2018-048750 | 3/2018 |
| WO | 2016/092872 | 6/2016 |

\* cited by examiner

FIG.9

| a(t) | du(t) |
|------|-------|
| 0    | $du_0$ |
| 1    | $du_1$ |
| ...  | ...   |
| j−1  | $du_{j-1}$ |

FIG.13

| a(t) | du(t) |
|---|---|
| 0 | −1 |
| 1 | 0 |
| 2 | 1 |

CONTROL DEVICE, CONTROL METHOD, AND NON-TRANSITORY RECORDING MEDIUM

CROSS-REFERENCE TO RELATED APPLICATION

This patent application is based on and claims priority to Japanese Patent Application No. 2018-231177, filed on Dec. 10, 2018, the entire contents of which are incorporated herein by reference.

BACKGROUND OF THE INVENTION

1. Field of the Invention

The present disclosure relates to a control device, a control method, and a program.

2. Description of the Related Art

In recent years, a method called deep reinforcement learning has become widely known as a type of machine learning. Deep reinforcement learning is a technique that determines a complex optimum action under a given environment, by combining conventional reinforcement learning, with deep learning which is a learning technique for a multilayered neural network.

Examples of application of reinforcement learning to industrial fields include application to an energy management field (Patent Document 1), application to plant control (Patent Document 2), and application to autonomous driving of a vehicle (Patent Document 3).

Also, as control devices widely used in industry, a temperature control device, a PLC (Programmable Logic Controller), a DCS (Distributed Control System), and the like are known. As control methods used in such control devices, PID (Proportional-Integral-Differential) control, model predictive control (MPC), internal model control, linear-quadratic-Gaussian (LQG) control, H2 control, $H^\infty$ control, and the like are known. These control methods are designed to make a process value of an object to be controlled follow a target value.

In addition, Patent Document 4 describes a technique for updating an operation amount, based on a predicted value of a convergence value of a process value according to a change in an operation amount up to the present time, and based on an adjusted target value deviation which is a difference from the target value.

Here, for example, conventional model predictive control is a method in which control assuring a characteristic of an object to be controlled (controlled object) is enabled, by calculating an optimum operation amount using a model of the controlled object, but it was not possible to accommodate changes over time (aging) in a controlled object, non-linearity, or other unexpected characteristics. On the other hand, considering application examples described in the above-described Patent Documents 1 to 3, it is considered that flexible control can be realized by applying deep reinforcement learning to control of a controlled object, which can accommodate aging, non-linearity, and other unexpected characteristics.

However, in deep reinforcement learning, a sufficient amount of training needs to be performed using data with sufficient variations under an environment in which state changes are known. Accordingly, in a case in which deep reinforcement learning is applied to control of a controlled object, there is a problem that a control rule obtained by the deep reinforcement learning becomes a black box. Thus, it may be difficult to judge whether the obtained control rule is correct or not.

For example, in the above-described application example described in Patent Document 1, training is repeated until temperature distribution becomes normal, based on simulation of air conditioning. However, in general, the simulation of air conditioning takes an extremely long time. Therefore, in a case in which deep reinforcement learning is applied, it may require an enormous learning time or may fail to converge. If the learning did not converge sufficiently, it would be difficult to determine whether or not the control rule was correct because the obtained control rule was a black box.

The present disclosure has been made in view of the above points, and is intended to realize flexible control through deep reinforcement learning while ensuring a control characteristic of a controlled object.

RELATED-ART DOCUMENTS

Patent Documents
[Patent Document 1] Japanese Laid-open Patent Application Publication No. 2018-48750
[Patent Document 2] Japanese Laid-open Patent Application Publication No. 2017-157112
[Patent Document 3] Japanese Laid-open Patent Application Publication No. 2018-37064
[Patent Document 4] International Publication Pamphlet No. WO 2016/092872

SUMMARY OF THE INVENTION

In order to solve the above-described problem, according to an embodiment of the present disclosure, there is provision of a control device for outputting an operation amount of a controlled object so as to cause a process value of the controlled object to track a target value. The control device includes: a target value look-ahead unit configured, in response to receiving a time series of target values and a look-ahead length, to acquire a look-ahead target value from among the target values included in the time series, the look-ahead target value being a target value after a lapse of time corresponding to the look-ahead length; a look-ahead target value deviation calculating unit configured to calculate a look-ahead target value deviation, which is a difference between the look-ahead target value and a current process value of the controlled object, the current process value being obtained from the controlled object or from a controlled object model made by modelling the controlled object; an adjusted target value deviation calculating unit configured to calculate an adjusted target value deviation, by adjusting the look-ahead target value deviation to a difference between the look-ahead target value and a predicted value of the process value after the lapse of time corresponding to the look-ahead length, based on a response model of the controlled object and a change amount of the operation amount from a past to a current time; and an operation amount calculation unit configured to perform reinforcement learning based on the adjusted target value deviation, and to calculate an updated operation amount based on the adjusted target value deviation.

BRIEF DESCRIPTION OF THE DRAWINGS

FIG. 9 is a diagram illustrating an example of a conversion table;

FIG. 13 is a diagram illustrating a conversion table in the practical example;

DETAILED DESCRIPTION OF THE PREFERRED EMBODIMENTS

Hereinafter, an embodiment of the present invention (hereinafter, also referred to as "the present embodiment") will be described in detail with reference to the drawings. In the following, a control device 10 will be described in which a characteristic of an object to be controlled (may also be referred to as a "controlled object") is secured by a response prediction using a model for the controlled object (that is, a controlled object is not a complete blackbox), and in which flexible control adapted to aging, non-linearity, and other unexpected characteristics is realized through deep reinforcement learning. Note that, in the control device 10 according to the present embodiment, before starting operation of the controlled object, sufficient training of the model for the controlled object (may also be referred to as a "controlled object model") is performed by deep reinforcement learning (hereinafter, this training may be referred to as "prior training"). When actually operating the controlled object, training by deep reinforcement learning is appropriately performed by using the results of the prior training as an initial value. Accordingly, flexible control can be realized that can accommodate aging of the controlled object (for example, a change in a characteristic), non-linearity, and other unexpected characteristics while securing the characteristic of the controlled object.

The control device 10 according to the present embodiment is not limited to a PLC, a DCS, an embedded computing device, or the like, and any other devices or apparatuses for operating a controlled object can be used. For example, a control device or apparatus used for various controls such as plant control, inverter control, mechanical control, electrical control, signal control, air conditioning control, temperature control, etc. may be used.

Further, the present embodiment will describe, as an example, a case of SISO (single-input and single-output) control, but the present embodiment is not limited thereto. For example, the present embodiment can be similarly applied to MIMO (multiple-input and multiple-output) control.

<Configuration of Control Device 10>

Figure 1:
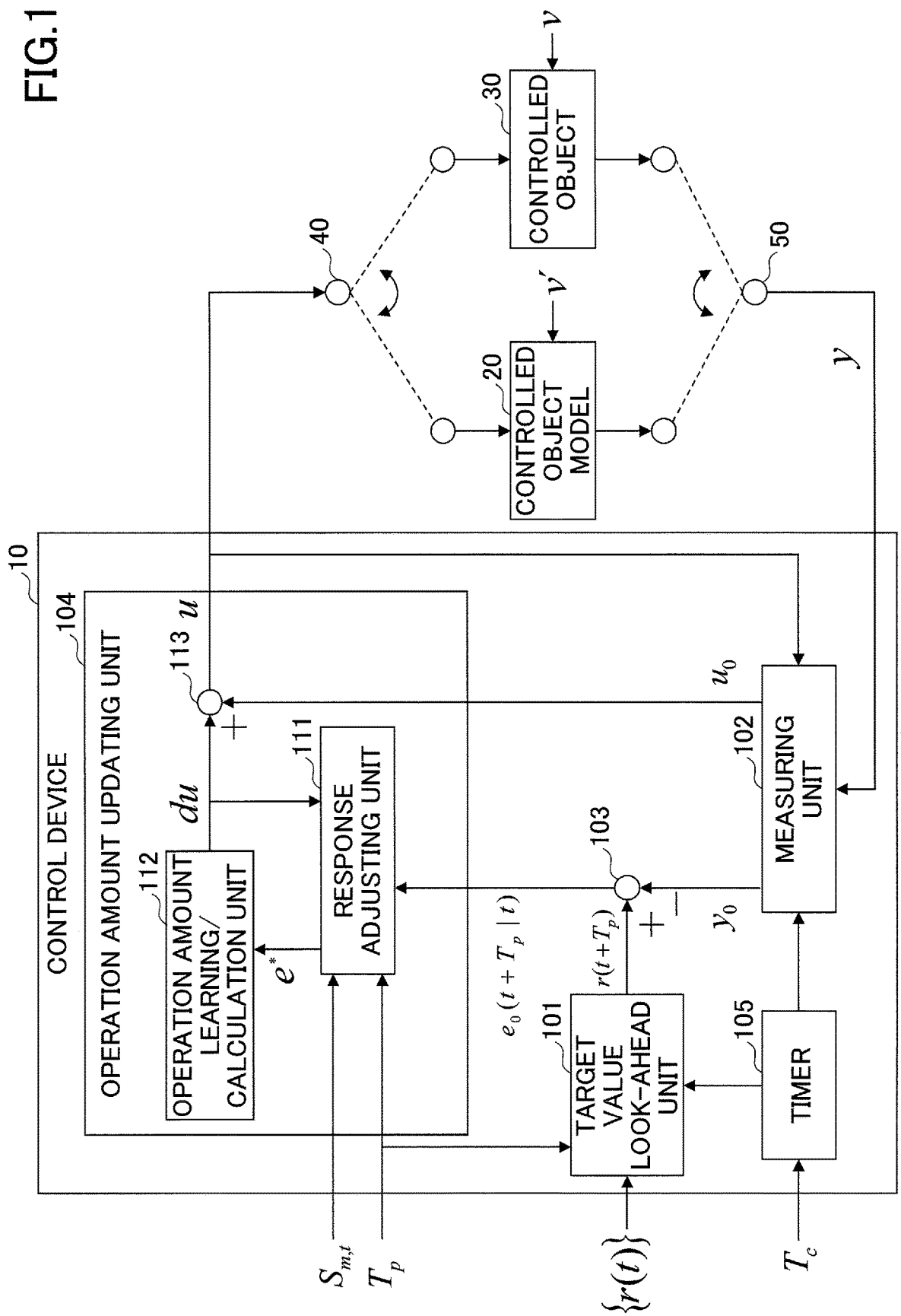
FIG. 1 is a diagram illustrating an example of a configuration of a control device according to a present embodiment.

First, a configuration of the control device 10 according to the present embodiment will be described with reference to FIG. 1. FIG. 1 is a diagram illustrating an example of the configuration of the control device 10 according to the present embodiment.

As illustrated in FIG. 1, the control device 10 according to the present embodiment includes a target value look-ahead unit 101, a measuring unit 102, a differential unit 103, an operation amount updating unit 104, and a timer 105. Each of these functional units is realized by a process performed by a processor or the like of the control device 10 executing one or more programs installed in the control device 10.

The target value look-ahead unit 101 receives, for each predetermined control cycle $T_c$, inputs of a time series of multiple target values (target value time series) $\{r(t)\}$ and a look-ahead time length $T_p$ (may also be referred to as a look-ahead length), and outputs a target value $r(t+T_p)$ at time $t+T_p$, which is a time after a lapse of the look-ahead length from the present time t. The look-ahead length $T_p$ is a time length for determining the target value $r(t+T_p)$ to be read within the target value time series $\{r(t)\}$. Hereinafter, the target value $r(t+T_p)$ is also referred to as a "look-ahead target value $r(t+T_p)$".

The measuring unit 102 measures a process value y of a controlled object model 20 or a controlled object 30 for each control cycle $T_c$. The measuring unit 102 outputs the latest value of the measured process value y as a current process value $y_0$. Since $y_0$ is the process value measured by the measuring unit 102, $y_0$ is also referred to as a "measured process value $y_0$". Therefore, the current process value means the latest measured process value.

Here, the controlled object 30 is an actual object to be controlled (which is an actual target of control such as a plant, an inverter, machinery, electrical equipment, signal equipment, air conditioning equipment, and temperature control equipment). Meanwhile, the controlled object model 20 is a model of the controlled object 30 (i.e., modeled data of the controlled object 30). The controlled object model 20 may be stored in a memory, such as an auxiliary storage device provided by the control device 10, or may be stored in a memory provided by another device different from the control device 10.

A process value y of the controlled object model 20 is determined in accordance with an operation amount u and a pseudo-disturbance v'. Meanwhile, a process value y of the controlled object 30 is determined in accordance with the operation amount u and a disturbance v. The pseudo-disturbance v' is given to the controlled object model 20, as a value equivalent to the disturbance v. Examples of the disturbance v include, in a case in which the controlled object 30 is a temperature control device and in which the process value y is temperature, a decrease or an increase in an outside air temperature.

The measuring unit 102 also acquires the operation amount u output from the operation amount updating unit 104, and outputs the latest value of the acquired operation amount u as a current operation amount $u_0$.

The differential unit 103 outputs a difference (deviation) between the look-ahead target value $r(t+T_p)$ output from the target value look-ahead unit 101 and the current process value $y_0$ (this difference (deviation) is denoted by $e_0(t+T_p|t)$). $e_0(t+T_p|t)$ is calculated by $e_0(t+T_p|t)=r(t+T_p)-y_0(t)$. Hereinafter, $e_0(t+T_p|t)$ is referred to as a "look-ahead target value deviation $e_0(t+T_p|t)$".

The operation amount updating unit 104 outputs the operation amount u to the controlled object model 20 or the controlled object 30, for each control cycle $T_c$. The operation amount updating unit 104 includes a response adjusting unit 111, an operation amount learning/calculation unit 112, and an adder 113.

Based on a response model of the controlled object 30 $S_{m,t}$ (hereinafter may be referred to as the "controlled object response model"), the look-ahead target value deviation $e_0(t+T_p|t)$, the look-ahead length $T_p$, and time series data {du(t)} of changes (du's) in the operation amount u in the past (the "du" may be referred to as an "operation change amount du"), the response adjusting unit 111 computes an adjusted target value deviation e*(t) used for calculating the operation change amount du. The controlled object response model $S_{m,t}$ is a model that predicts a response at time m of the controlled object 30 at time t. Details of a calculation method of the adjusted target value deviation e*(t) are described later.

The operation amount learning/calculation unit 112 calculates the operation change amount du(t) for each control cycle $T_c$ based on the adjusted target value deviation e*(t) computed by the response adjusting unit 111. At this time, the operation amount learning/calculation unit 112 can perform deep reinforcement learning at the same time as the calculation of the operation change amount du(t). Details of the calculation of the operation change amount du(t) and the learning by deep reinforcement learning will be described below.

Here, the operation amount learning/calculation unit 112 calculates and outputs the operation change amounts du(t) in an order of, for example, $du(t-3T_c)$, $du(t-2T_c)$, and $du(t-T_c)$. The operation change amount du is an amount of change of the operation amount u for each control cycle $T_c$.

The adder 113 calculates a new (updated) operation amount u by adding the current operation amount $u_0$ output from the measuring unit 102 and the operation change amount du output from the operation amount learning/calculation unit 112. The adder 113 outputs this (updated) operation amount u to the controlled object model 20 or the controlled object 30. This operation amount u is calculated based on a formula of $u(t)=u_0+du(t)=u(t-T_c)+du(t)$.

In the control device 10 according to the present embodiment, the operation amount u calculated by the adder 113 is directly output to the controlled object model 20 or the controlled object 30. However, for example, in a case in which there is a limit on the operation amount u, a limiter or the like may be provided in the control device 10. The operation amount u calculated by the adder 113 may be input to the limiter, and an operation amount output from the limiter may be transmitted to the controlled object model 20 or the controlled object 30.

The timer 105 operates the target value look-ahead unit 101 and the measuring unit 102 for each control cycle $T_c$. Because the target value look-ahead unit 101 and the measuring unit 102 operate for each control cycle $T_c$, the operation amount updating unit 104 also operates for each control cycle $T_c$.

The control device 10 according to the present embodiment is connected to a switcher 40 and a switcher 50 for switching between the controlled object model 20 and the controlled object 30. By the switchers 40 and 50, the control device 10 configures a closed loop with either the controlled object model 20 or the controlled object 30. Here, the control device 10 according to the present embodiment configures a closed loop with the controlled object model 20 before starting operation of the controlled object 30, and training is performed through deep reinforcement learning. During an actual operation, the control device 10 according to the present embodiment configures a closed loop with the controlled object 30, and appropriately performs learning by using deep reinforcement learning.

As described above, the control device 10 according to the present embodiment performs learning by using the controlled object model 20 before starting an actual operation. Then, the control device 10 according to the present embodiment performs control of the controlled object 30 using a learning result obtained by using the controlled object model 20 as an initial value, and also performs learning appropriately by using the deep reinforcement learning. That is, in the control device 10 according to the present embodiment, an operation of the controlled object 30 can be started from a state in which the operation amount learning/calculation unit 112 has been trained to a certain extent. Accordingly, a flexible control can be realized in which a characteristic of the controlled object 30 is assured while the controlled object 30 can be adapted to aging (e.g., a change in characteristic), non-linearity, or other unexpected characteristics.

<Operation of Target Value Look-Ahead Unit 101>

Figure 2:
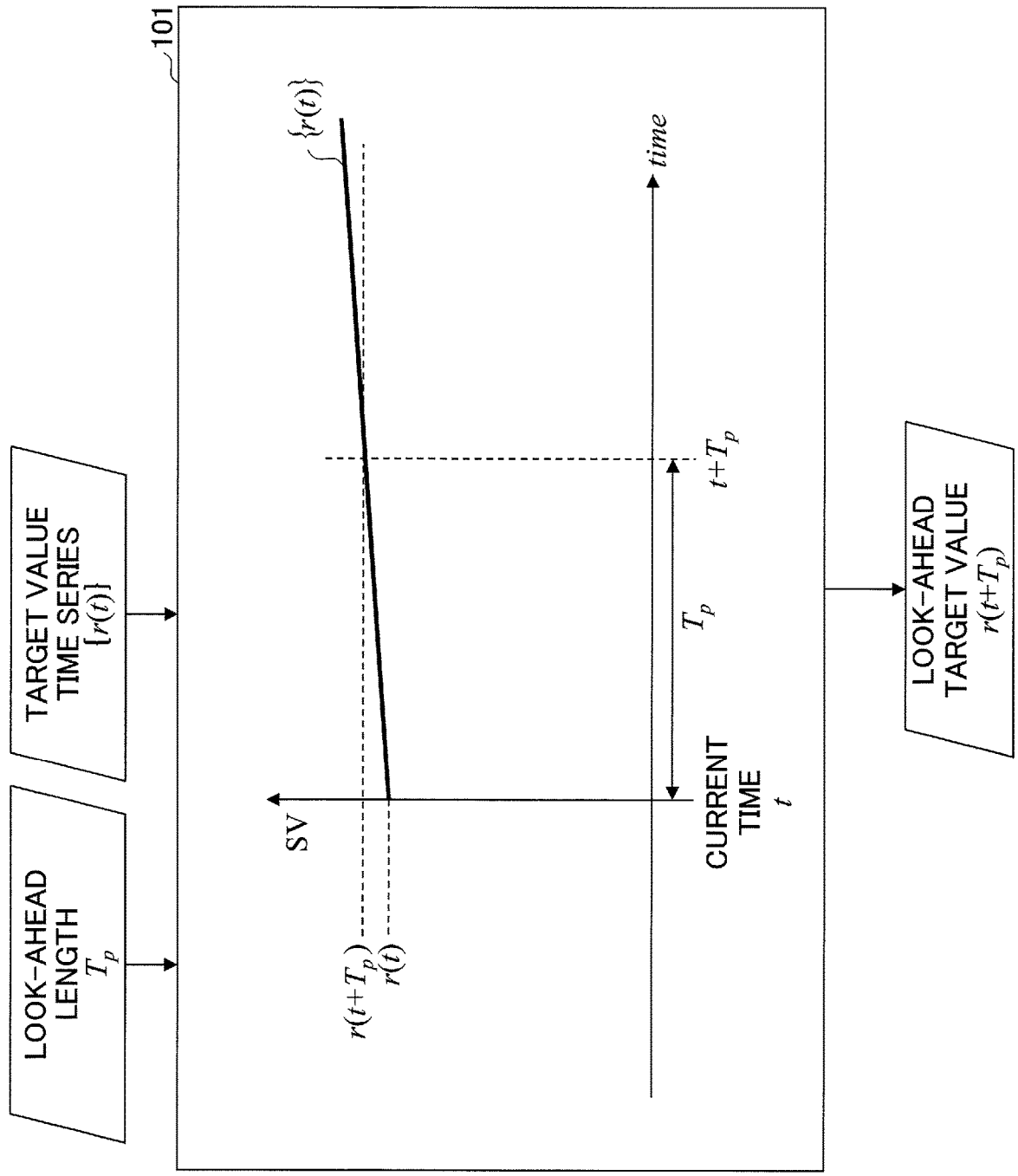
FIG. 2 is a diagram for explaining an example of an operation of a target value look-ahead unit.

Next, the operation of the target value look-ahead unit 101 will be described with reference to FIG. 2. FIG. 2 is a diagram for explaining an example of an operation of the target value look-ahead unit 101.

As illustrated in FIG. 2, when a target value time series {r(t)} and a look-ahead length $T_p$ are input, the target value look-ahead unit 101 outputs a look-ahead target value $r(t+T_p)$ corresponding to time $t+T_p$, which is the time after a lapse of the look-ahead length from the present time t. Note that "SV" (vertical axis) in FIG. 2 represents a target value of a process value.

As described above, the target value look-ahead unit 101 outputs, within the target value time series {r(t)}, a target value $r(t+T_p)$ corresponding to time $t+T_p$, which is the time after a lapse of the look-ahead length.

Incidentally, FIG. 2 illustrates a case in which the target value time series {r(t)} is represented by a straight line, but is not limited thereto. The target value time series {r(t)} may be represented by any curves, polygonal lines, or the like. In particular, the target value time series {r(t)} may be represented by a curve that varies periodically with time t.

The target value time series {r(t)} may be set in advance, or a target value r(t) of a future time may be updated as needed. For example, the target value r(t) may be updated after a certain period of time has elapsed when the controlled object 30 is controlled by a program.

<Operation of Response Adjusting Unit 111>

Figure 3:
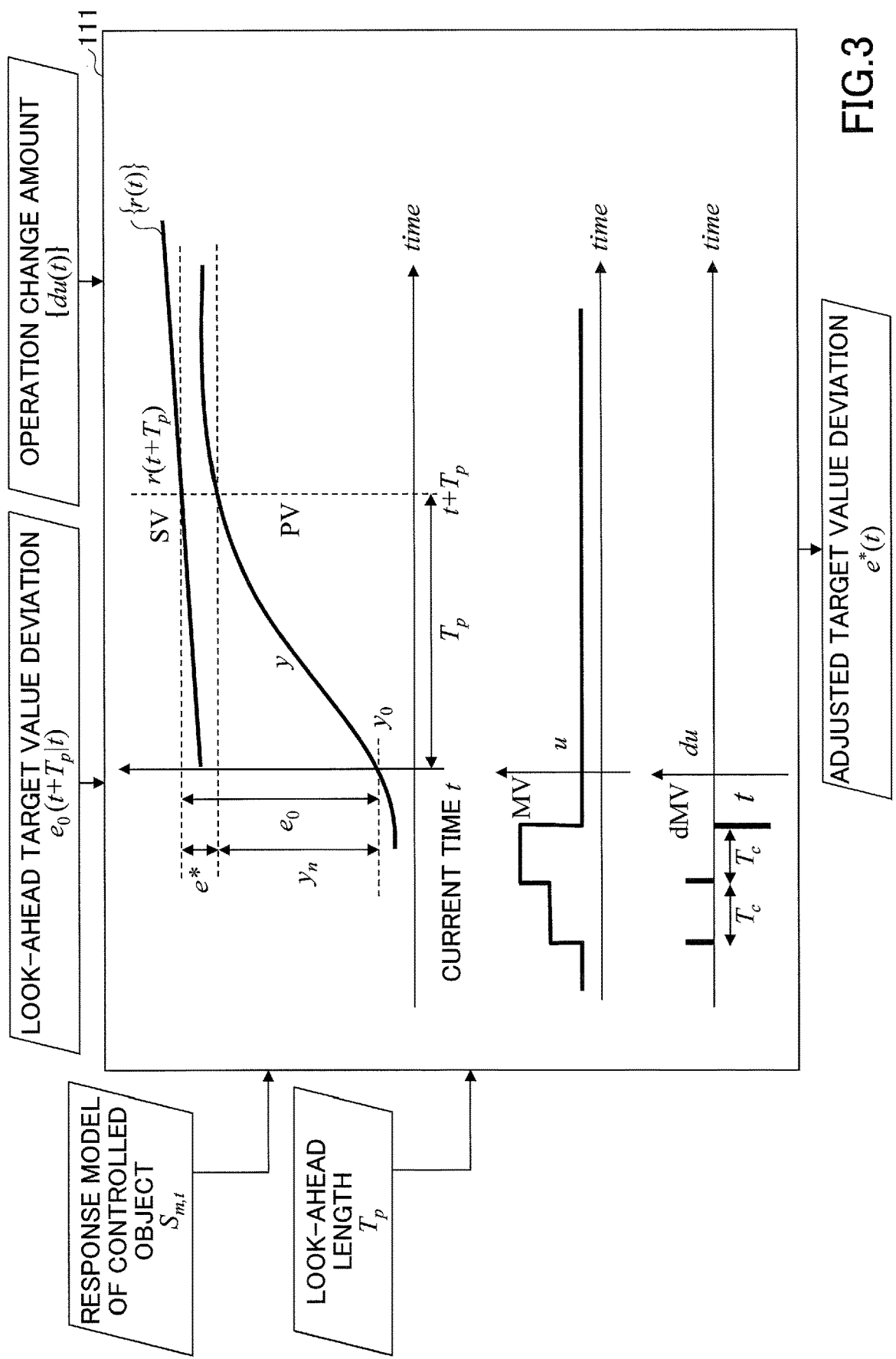
FIG. 3 is a first diagram illustrating an example of an operation of a response adjusting unit.

Next, an operation of the response adjusting unit 111 will be described with reference to FIG. 3. FIG. 3 is a first diagram for explaining an example of the operation of the response adjusting unit 111.

As illustrated in FIG. 3, when the controlled object response model $S_{m,t}$, the look-ahead target value deviation $e_0(t+T_p|t)$, the look-ahead length $T_p$, and the time series of an operation change amount {du(t)} are input to the response adjusting unit 111, the response adjusting unit 111 outputs the adjusted target value deviation e*(t) in accordance with the following steps S1 and S2. In FIG. 3, SV represents a target value of a process value, PV represents the process value, MV represents an operation amount, and dMV represents an operation change amount.

Step S1: The response adjusting unit 111 calculates a change amount of a process value, by which a current process value (which is $y_0$) is expected to change after lapse of time $T_p$ due to a past operation change amount du. The calculated change amount is referred to as an "adjustment value of look-ahead response", and is denoted by $y_n(t)$. For example, when the current time is t, the past operation change amount du is expressed as $du(t-T_c)$, $du(t-2T_c)$, etc.

Step S2: The response adjusting unit 111 calculates the adjusted target value deviation $e^*(t)$, by adjusting the look-ahead target value deviation $e_0(t+T_p|t)$ with the adjustment value of look-ahead response $y_n(t)$, and outputs the calculated adjusted target value deviation $e^*(t)$. The adjusted target value deviation $e^*(t)$ is calculated by $e^*(t)=e_0(t+T_p|t)-y_n(t)=r(t+T_p)-(y_0(t)+y_n(t))$.

Here, as an example, a case in which the adjustment value of look-ahead response $y_n(t)$ is calculated using the controlled object response model $S_{m,t}$ will be described.

The controlled object response model $S_{m,t}$ can be expressed by a function. If letting this function be $y_{n,c}(m|t)$, to be referred to as a controlled object response model function, then the controlled object response model function $y_{n,c}(m|t)$ can be expressed as (Formula 1) described below:

$$y_{n,c}(m|t)=S_{m,t}(\{du(t-kT_c)\}_{k=0}^K) \quad \text{(Formula 1)},$$

where K is a length of the model (model interval). That is, the controlled object response model function $y_{n,c}(m|t)$ is a function that predicts a response at time m through the controlled object response model $S_{m,t}$ at time t, by using a time series of past operation change amounts $\{du(t), du(t-T_c), \ldots, du(t-KT_c)\}$.

Here, a predicted value of a response at time $t+T_p$ that is predicted, at time t, through the controlled object response model $S_{m,t}$ by using the time series of the past operation change amounts $\{du(t), du(t-T_c), \ldots, du(t-KT_c)\}$ is referred to as a predicted look-ahead response value, and is denoted by $y_{n,A}(t)$. In other words, $$y_{n,A}(t)=S_{t+T_p,t}(\{du(t-kT_c)\}_{k=0}^K) \quad \text{(Formula 2)}.$$

Further, a predicted (estimated) value of a response at time t that is predicted (estimated), at time t, through the controlled object response model $S_{m,t}$ by using the time series of the past operation change amounts $\{du(t), du(t-T_c), \ldots, du(t-KT_c)\}$ is referred to as a predicted natural response value, and is denoted by $y_{n,B}(t)$. In other words, $$y_{n,B}(t)=S_{t,t}(\{du(t-kT_c)\}_{k=0}^K) \quad \text{(Formula 3)}.$$

A difference between the predicted look-ahead response value $y_{n,A}(t)$ and the predicted natural response value $y_{n,B}(t)$ is the adjustment value of look-ahead response $y_n(t)$. That is, $y_n(t)=y_{n,A}(t)-y_{n,B}(t)$. Thus, the adjustment value of look-ahead response $y_n(t)$ can be calculated.

If the controlled object response model function $y_{n,c}(m|t)$ illustrated in the above Formula 1 above is referred to as a generalized predicted value, then the generalized predicted value $y_{n,c}(m|t)$ is, the same as the above Formula 1, expressed as follows:

$$y_{n,c}(m|t)=S_{m,t}(\{du(t-kT_c)\}_{k=0}^K) \quad \text{(Formula 4)}.$$

In this case, a relationship between the generalized predicted value $y_{n,c}(m|t)$ and the predicted look-ahead response value $y_{n,A}(t)$ is expressed as $y_{n,A}(t)=y_{n,c}(t+T_p|t)$. Also, a relationship between the generalized predicted value $y_{n,c}(m|t)$ and the predicted natural response value $y_{n,B}(t)$ is expressed as $y_{n,B}(t)=y_{n,c}(t|t)$.

Figure 4:
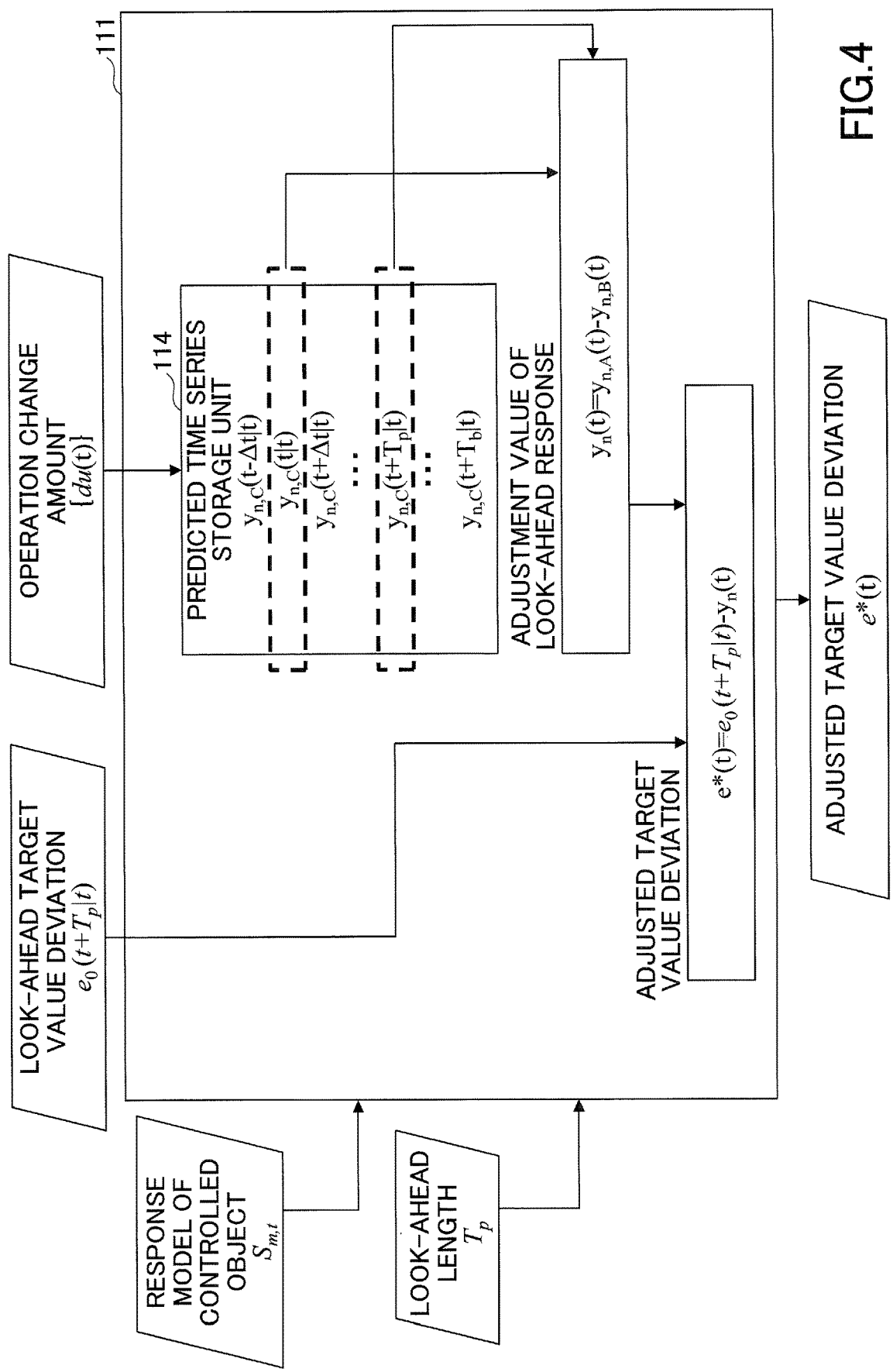
FIG. 4 is a second diagram illustrating an example of the operation of the response adjusting unit.

Hereinafter, as an example, a case, in which the response adjusting unit 111 calculates the adjusted target value deviation $e^*(t)$ by using a predicted time series storage unit 114 that stores time series data of the generalized predicted values $y_{n,c}(m|t)$ (hereinafter may also be referred to as a "predicted time series"), will be described with reference to FIG. 4. FIG. 4 is a second diagram for explaining an example of the operation of the response adjusting unit 111. The predicted time series storage unit 114 can be implemented using a storage device such as an auxiliary storage device or a RAM (Random Access Memory).

Let "t" be a current time. As illustrated in FIG. 4, the predicted time series storage unit 114 stores the generalized predicted values from time t−Δt to future time t+$T_b$, which are $y_{n,c}(t-\Delta t|t)$, $y_{n,c}(t|t)$, $y_{n,c}(t+\Delta t|t)$, ..., $y_{n,c}(t+T_p|t)$, ..., $y_{n,c}(t+T_b|t)$. It should be noted that $T_b$ is a constant that determines a length (time length) of the generalized predicted values $y_{n,c}$ stored in the predicted time series storage unit 114. For example, $T_b$ can be expressed as $T_b=N\times T_c$ (where N is a predetermined integer satisfying $N\times T_c \leq T_p$).

At this time, as illustrated in FIG. 4, the adjustment value of look-ahead response $y_n(t)$ is calculated as $y_n(t)=y_{n,A}(t)-y_{n,B}(t)$, by using $y_{n,A}(t)=y_{n,c}(t+T_p|t)$ and $y_{n,B}(t)=y_{n,c}(t|t)$ stored in the predicted time series storage unit 114. Thus, the adjusted target value deviation $e^*(t)$ is calculated as $e^*(t)=e_0(t+T_p|t)-y_n(t)$, by using this adjustment value of look-ahead response $y_n(t)$. As described above, by using the predicted time series storage unit 114, the response adjusting unit 111 can calculate the adjusted target value deviation $e^*(t)$ with small calculation cost and a small amount of memory. Note that the predicted time series stored in the predicted time series storage unit 114 is updated every time a new operation change amount du(t) is output from the operation amount learning/calculation unit 112.

<Controlled Object Response Model Function $y_{n,c}$>

As the controlled object response model function $y_{n,c}$ illustrated in the above Formula 1, any of the following functions (1) to (3) can be used, for example.

(1) Linear Predictive Function

When the controlled object response model $S_{m,t}$ is a step response model, the following linear predictive function can be used as the controlled object response model function $y_{n,c}$:

$$y_{n,c}(m|t)=\sum_{k=0}^{K}S(m+kT_c)du(t-kT_c), \quad \text{(Formula 5)}$$

where $\{S(t)\}$ is the controlled object response model $S_{m,t}$ when it is a step response model.

(2) Nonlinear Predictive Function

The following nonlinear predictive function can be used as the controlled object response model function $y_{n,c}$:

$$y_{n,c}(m|t)=S_{m,t}(\{du(t-kT_c)\}_{k=0}^K) \quad \text{(Formula 6)},$$

where the controlled object response model $S_{m,t}$ is not necessarily a linear model.

(3) Neural Network

Figure 5:
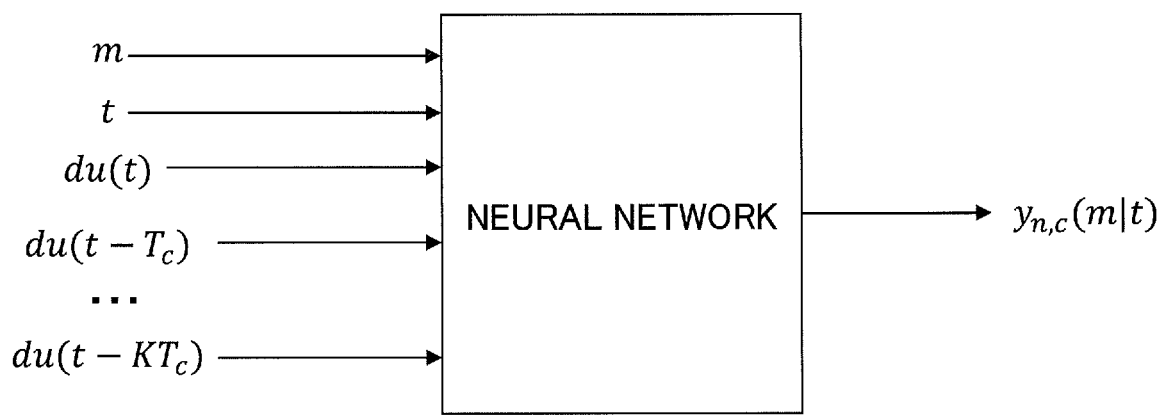
FIG. 5 is a schematic diagram illustrating an example in which a response model function of a control target is implemented by a neural network.

For example, as illustrated in FIG. 5, a function describing any neural network having m, t, and $\{du(t), du(t-T_c), \ldots, du(t-KT_c)\}$ as inputs can be used (described) as the controlled object response model function $y_{n,c}$.

<Operation of Operation Amount Learning/Calculation Unit 112>

Figure 6:
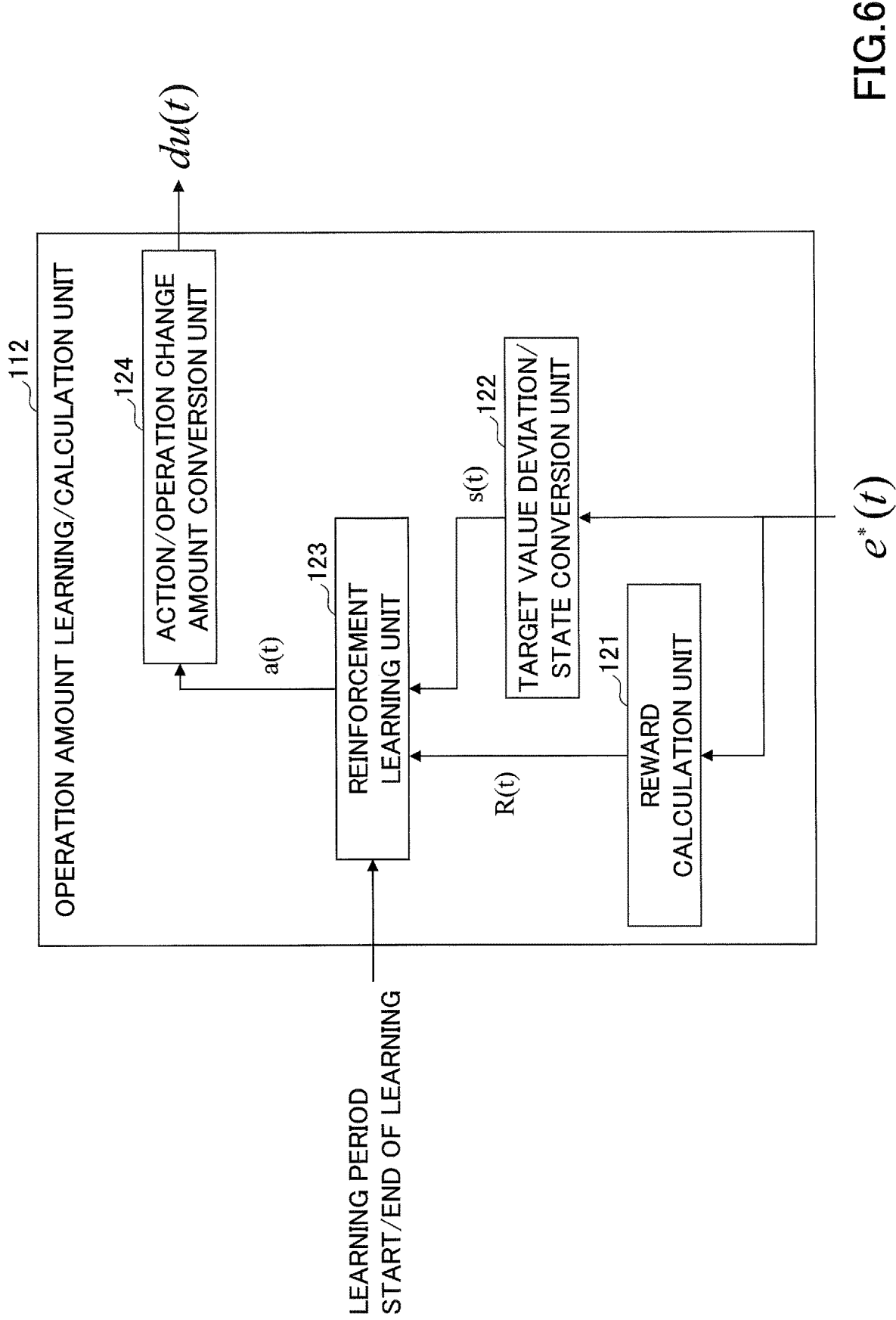
FIG. 6 is a diagram for explaining an example of an operation of an operation amount learning/calculation unit.

Next, an operation of the operation amount learning/calculation unit 112 will be described with reference to FIG. 6. FIG. 6 is a diagram for explaining an example of the operation of the operation amount learning/calculation unit 112.

As illustrated in FIG. 6, the operation amount learning/calculation unit 112 receives an input of the adjusted target value deviation e*(t), and outputs the operation change amount du(t). Here, the operation amount learning/calculation unit 112 includes a reward calculation unit 121, a target value deviation/state conversion unit 122, a reinforcement learning unit 123, and an action/operation change amount conversion unit 124.

When the adjusted target value deviation e*(t) is input to the reward calculation unit 121, the reward calculation unit 121 calculates a reward R(t) that is required for deep reinforcement learning.

The target value deviation/state conversion unit 122 receives an input of the adjusted target value deviation e*(t), and generates a state s(t) of deep reinforcement learning. This state s(t) includes the adjusted target value deviation e*(t). As the state s(t), the adjusted target value deviation e*(t) itself may be employed, or a value of a derivative of the adjusted target value deviation e*(t), a value of an integral of the adjusted target value deviation e*(t), or any other transformation of the adjusted target value deviation e*(t) may be employed. Alternatively, the state s(t) may include a process value, an operation amount, or an observed value observed from the controlled object, in addition to the adjusted target value deviation e*(t). The state s(t) may be referred to as a "state variable s(t)".

When the reward R(t) and the state s(t) are input to the reinforcement learning unit 123, the reinforcement learning unit 123 outputs an action a(t) and performs learning. Details of the learning will be discussed below.

Here, for example, when learning is performed periodically at a fixed interval, a command indicating a learning period may be input to the reinforcement learning unit 123. Also, for example, in a case in which start or stop of learning is controlled, a command indicating the start or stop of learning may be input to the reinforcement learning unit 123.

The action/operation change amount conversion unit 124 converts the action a(t) output from the reinforcement learning unit 123 into the operation change amount du(t).

<Operation of Reinforcement Learning Unit 123>

Figure 7:
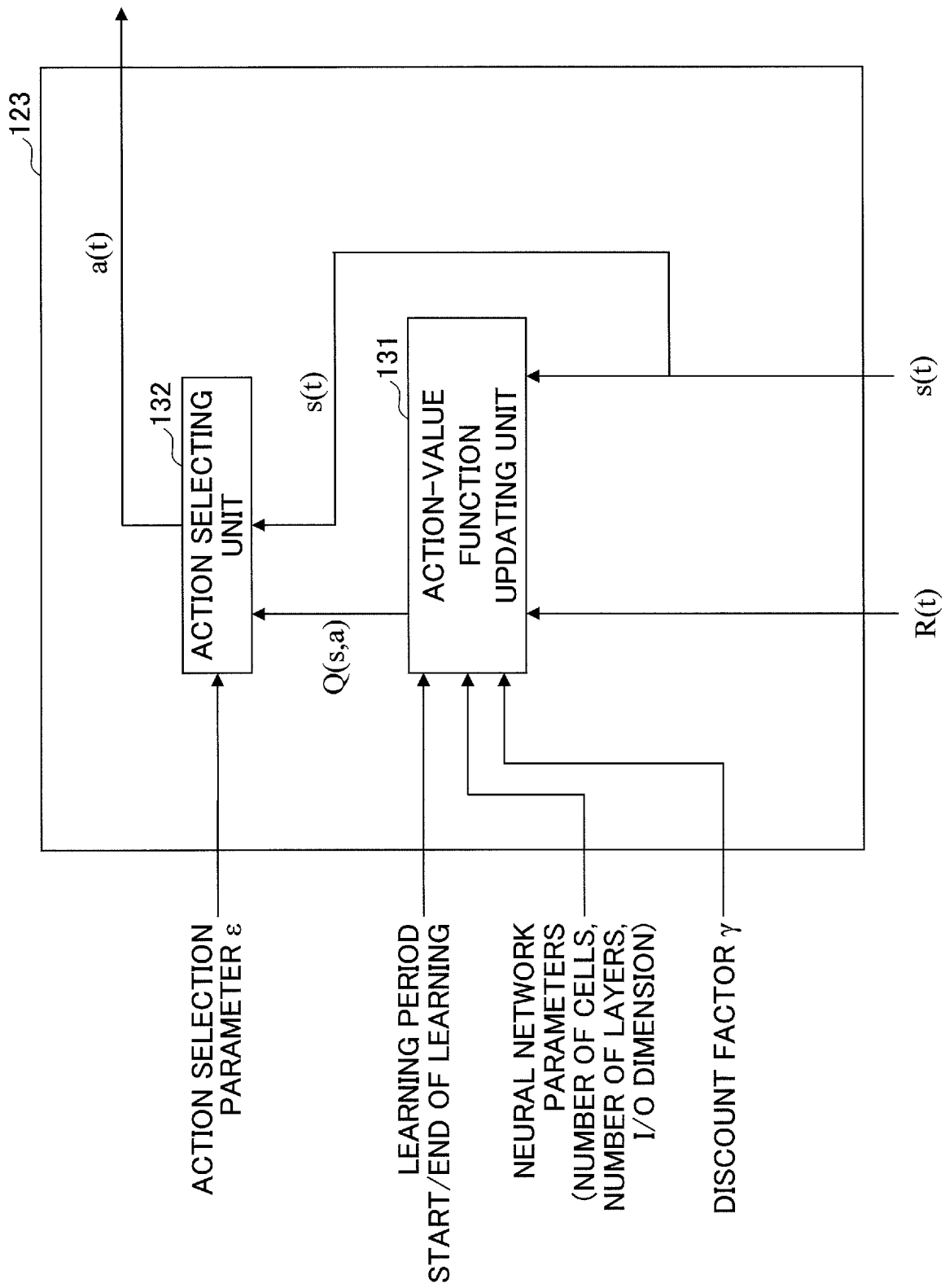
FIG. 7 is a diagram illustrating an example of an operation of a reinforcement learning unit.

Next, an operation of the reinforcement learning unit 123 will be described with reference to FIG. 7. FIG. 7 is a diagram for explaining an example of the operation of the reinforcement learning unit 123.

As illustrated in FIG. 7, the reinforcement learning unit 123 receives the reward R(t) and the state s(t), and outputs the action a(t). The reinforcement learning unit 123 also performs learning by updating an action-value function Q(s, a). The action-value function Q(s, a) is a function representing an expected return when an action a(t) is taken in a state s(t). Here, the reinforcement learning unit 123 includes an action-value function updating unit 131 and an action selecting unit 132.

The action-value function updating unit 131 updates the action-value function Q(s, a). In deep reinforcement learning, the action-value function Q(s, a) is implemented by a multilayered neural network (the multilayered neural network may also be referred to as a "deep neural network"). Accordingly, parameters (such as the number of cells, the number of layers, and the input/output dimensions) of the neural network are given to the action-value function updating unit 131. In addition, the action-value function updating unit 131 receives a discount factor γ indicating to what extent the future value is evaluated. As described above, a command indicating a learning cycle or start/end of the learning may be given to the action-value function updating unit 131.

As an algorithm for updating the action-value function Q(s, a), the action-value function updating unit 131 may use known techniques for deep reinforcement learning, such as temporal difference (TD) method (may also be referred to as "TD learning").

The action selecting unit 132 selects an appropriate action a(t) for a current state s(t), by referring to the action-value function Q(s, a). As an algorithm for selecting an action a(t), the action selecting unit 132 may use a known method for deep reinforcement learning, such as ε-Greedy method. In a case in which ε-Greedy method is used, ε, which has a value between 0 and 1, is set as an action selection parameter.

In the present embodiment, a method called DQN (Deep Q-Network) method is used as a method for deep reinforcement learning, but applicable methods for deep reinforcement learning are not limited thereto. For example, known methods for deep reinforcement learning, such as a PG (Policy Gradient) method and an AC (Actor Critic) method, may be used.

<Updating Action-Value Function Q(s, a)>

Here, as an example, a case will be described in which the action-value function updating unit 131 updates the action-value function Q(s, a) at a certain time t, where the state s=s(t) is represented by a vector of i variables $s_1, \ldots s_i$ and the action a=a(t) can take one of j discrete values $a_1, \ldots, a_j$. Note that a set of $a_1, \ldots, a_j$ may also be referred to as an action set.

Figure 8:
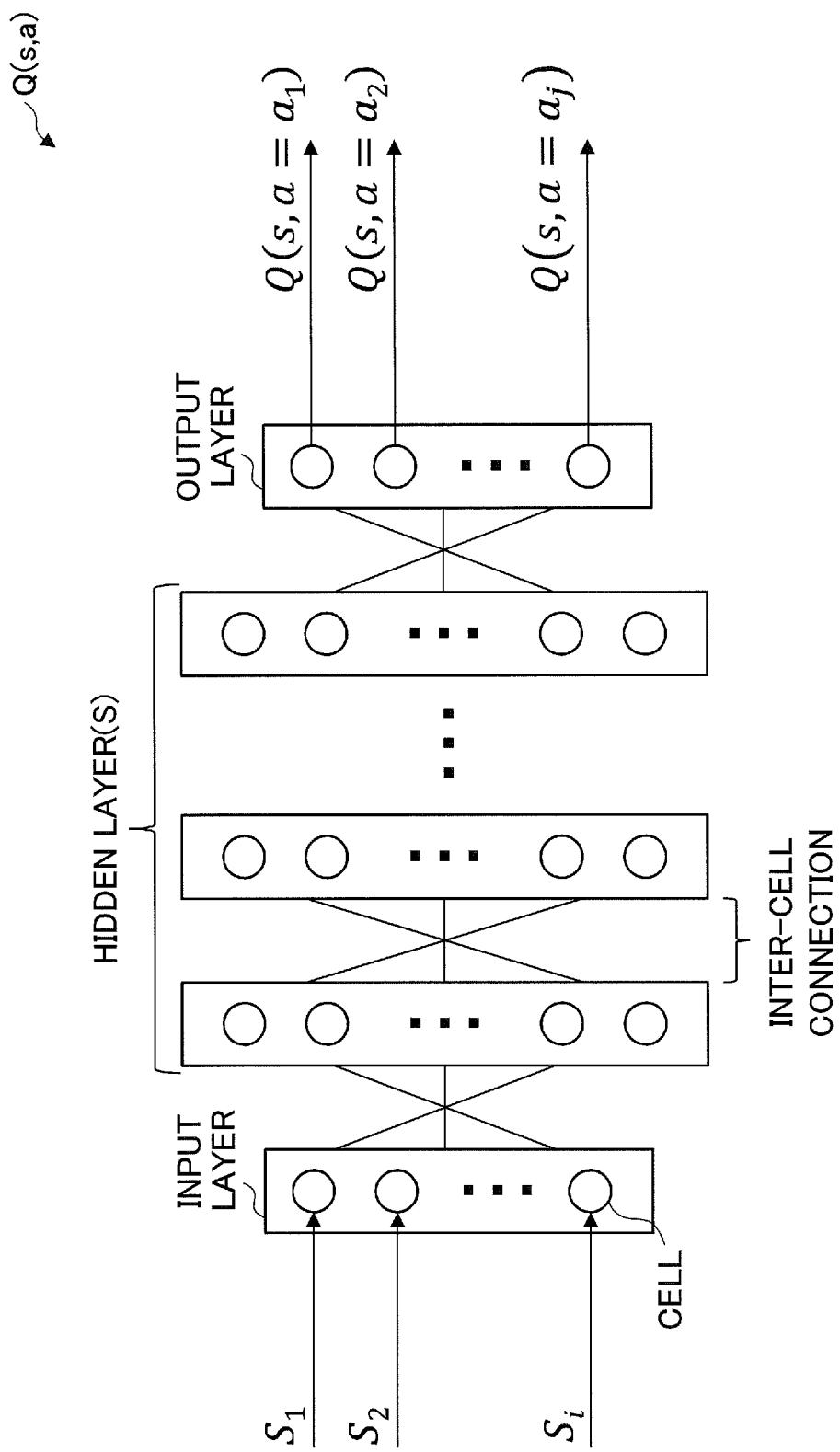
FIG. 8 is a diagram schematically illustrating an example in which an action-value function is implemented by a multilayered neural network.

As illustrated in FIG. 8, the present embodiment describes a case in which the action-value function Q(s, a) is implemented by a multilayered neural network that receives inputs of $s_1, \ldots,$ and $s_i$ and that outputs $Q(s, a_1), \ldots,$ and $Q(s, a_j)$. The multilayered neural network includes an input layer, one or more hidden layers, and an output layer, and each cell in a layer is connected with at least one cell in another layer, via an inter-cell connection. The number of cells in the input layer needs to be i, and the number of cells in the output layer needs to be j. However, the number of cells in the hidden layer(s) is not required to be a specific number. The number of hidden layers may also be optional.

In the case in which the action-value function Q(s, a) is implemented by a neural network, the neural network is trained such that weights assigned to the inter-cell connections and offsets (also referred to as "bias") are improved. As an activation function in each of the layers, a sigmoid function, a rectified linear unit (ReLU), or the like is used, for example.

At this time, the action-value function updating unit 131 may update the action-value function Q(s, a) by using, for example, TD learning. In the TD learning, the action-value function Q(s, a) is updated in accordance with the following update rule:

$$Q(s, a) \leftarrow Q(s, a) + \alpha \left( R(t) + \gamma \max_{a' \in A} Q(s', a') - Q(s, a) \right) \quad \text{(Formula 7)}$$

where α is a learning coefficient and s' is a next (new) state of a state s when an action "a" is taken.

In the present embodiment, as described above, each of the elements $s_1, \ldots,$ and $s_i$ of the state $s=s(t)$ is a value converted from the adjusted target value deviation $e^*(t)$. Therefore, in the present embodiment, training (i.e., updates of the action-value function $Q(s, a)$) can be efficiently performed with a small number of elements.

The action-value function updating unit 131 may update the action-value function $Q(s, a)$ by using other known methods such as Sarsa, Monte Carlo method, TD-Lambda, or eligibility traces, in addition to the aforementioned TD learning.

<Selection of Action a>

Next, as an example, a case in which the action selecting unit 132 selects an action $a=a(t)$ at a certain time t by the E-Greedy method will be described.

The action selecting unit 132 selects an appropriate action $a(t)$ for a current state $s(t)$ by referring to the action-value function $Q(s, a)$, but chooses an optimal action $a^*(t)$ with a probability $(1-\varepsilon)$ (where $\varepsilon$ is a constant), while selecting a random action with a probability $\varepsilon$. That is, the action selecting unit 132 selects an action $a(t)$ in accordance with the following Formula 8:

$$a(t) = \begin{cases} a^*(t) & \text{with } \Pr = 1 - \varepsilon \\ \text{random action} & \text{with } \Pr = \varepsilon \end{cases} \quad \text{(Formula 8)}$$

where $a^*(t)$ is the optimal action (i.e., the action in which the action-value function $Q(s, a)$ becomes maximum), and $a^*(t)$ is expressed by the following Formula 9:

$$a^*(t) = \arg\max_a Q(s(t), a). \quad \text{(Formula 9)}$$

Thus, in the $\varepsilon$-Greedy method, the action selection parameter $\varepsilon$ is an adjustment parameter for randomly searching for a new action.

<Conversion to Operation Change Amount Du>

Next, we will explain how to convert the action $a(t)$ into the operation change amount $du(t)$. The action/operation change amount conversion unit 124 can convert the action $a(t)$ to the operation change amount $du(t)$, by the following (1) or (2), for example.

(1) Conversion by Function

The action/operation change amount conversion unit 124 can convert the action $a(t)$ to the operation change amount $du(t)$ by using a predetermined function f.

(2) Conversion Using Conversion Table

Figure 9:
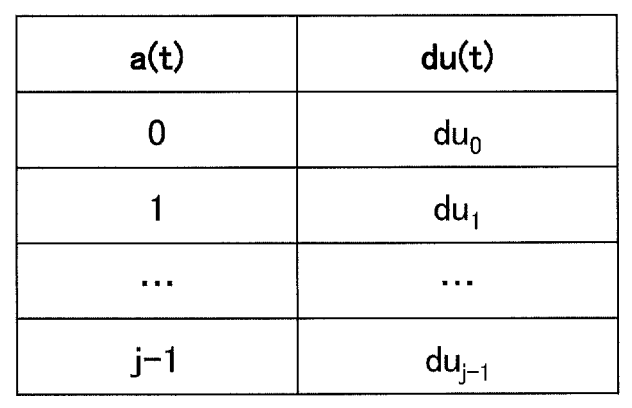

As an example, suppose that a possible value of the action $a(t)$ is between 0 to $(j-1)$. In this case, the action/operation change amount conversion unit 124 can convert the action $a(t)$ to the operation change amount $du(t)$ by using, for example, a conversion table illustrated in FIG. 9. That is, when $a(t)=0$, the action/operation change amount conversion unit 124 converts the $a(t)$ to $du_0$; and when $a(t)=1$, the action/operation change amount conversion unit 124 converts the $a(t)$ to $du_1$. Thereafter, similarly, the action/operation change amount conversion unit 124 converts a value of the action $a(t)$ to a value of the operation change $du(t)$ corresponding to the value of the action $a(t)$. The conversion table is stored in a storage device such as an auxiliary storage device.

Even in a case in which multiple operation amounts are present, the above-described method is applicable by converting j number of actions $a(t)$. For example, when there are M number of operation amounts, a method may be used in which the action $a(t)$ is defined as an M-digit number represented in a base-N system and in which an M-th operation (change) amount is associated with an M-th digit of the action $a(t)$ represented in the base-N system. As an example, in a case of expressing two operation amounts by using a ternary (base 3) system, the two operation amounts can be expressed by using 8 numbers of 00 (=0 in decimal), 01 (=1 in decimal), 02 (=2 in decimal), 10 (=3 in decimal), 11 (=4 in decimal), 12 (=5 in decimal), 20 (=6 in decimal), 21 (=7 in decimal), and 22 (=8 in decimal). In addition, correspondence between an operation and a figure of each digit may be defined, such as "0" represents "decreasing an operation amount", "1" represents "maintaining an operation amount", and "2" represents "increasing an operation amount". Such correspondence may be set in the action/operation change amount conversion unit 124 in advance.

<Calculation of Reward R>

Next, a method in which the reward calculation unit 121 calculates a reward $R(t)$ from the adjusted target value deviation $e^*(t)$ will be described. The reward calculation unit 121 can calculate the reward $R(t)$ by, for example, any of the following calculation methods (1) to (3).

(1) Absolute Value

The reward calculation unit 121 can calculate the reward $R(t)$ by using $R(t)=(-1)\times|e^*(t)|=-|e^*(t)|$.

(2) Square

The reward calculation unit 121 can calculate the reward $R(t)$ by using $R(t)=(-1)\times(e^*(t))^2=-(e^*(t))^2$.

(3) Any Function

The reward calculation unit 121 can calculate the reward $R(t)$ by using any appropriate function g, that is, $R(t)=g(e^*(t))$.

The reason for multiplying a negative number (−1) in the above-described (1) and (2) is that the reward $R(t)$ should generally be maximized in deep reinforcement learning while the adjusted target value deviation $e^*(t)$ is preferably smaller.

Further, the reward $R(t)$ is not required to be calculated in accordance with an expression described in the above (1), (2), or (3). It is sufficient that the adjusted target value deviation $e^*(t)$ is used to calculate the reward $R(t)$, and the reward $R(t)$ may be calculated by an expression to which any terms are added to the above-described expression. For example, the reward $R(t)$ may be calculated by using an expression including a penalty term, in order to prevent an operation amount from becoming excessively large, or in order to prevent an update frequency of an operation amount becoming excessively large.

<Hardware Configuration of Control Device 10>

Figure 10:
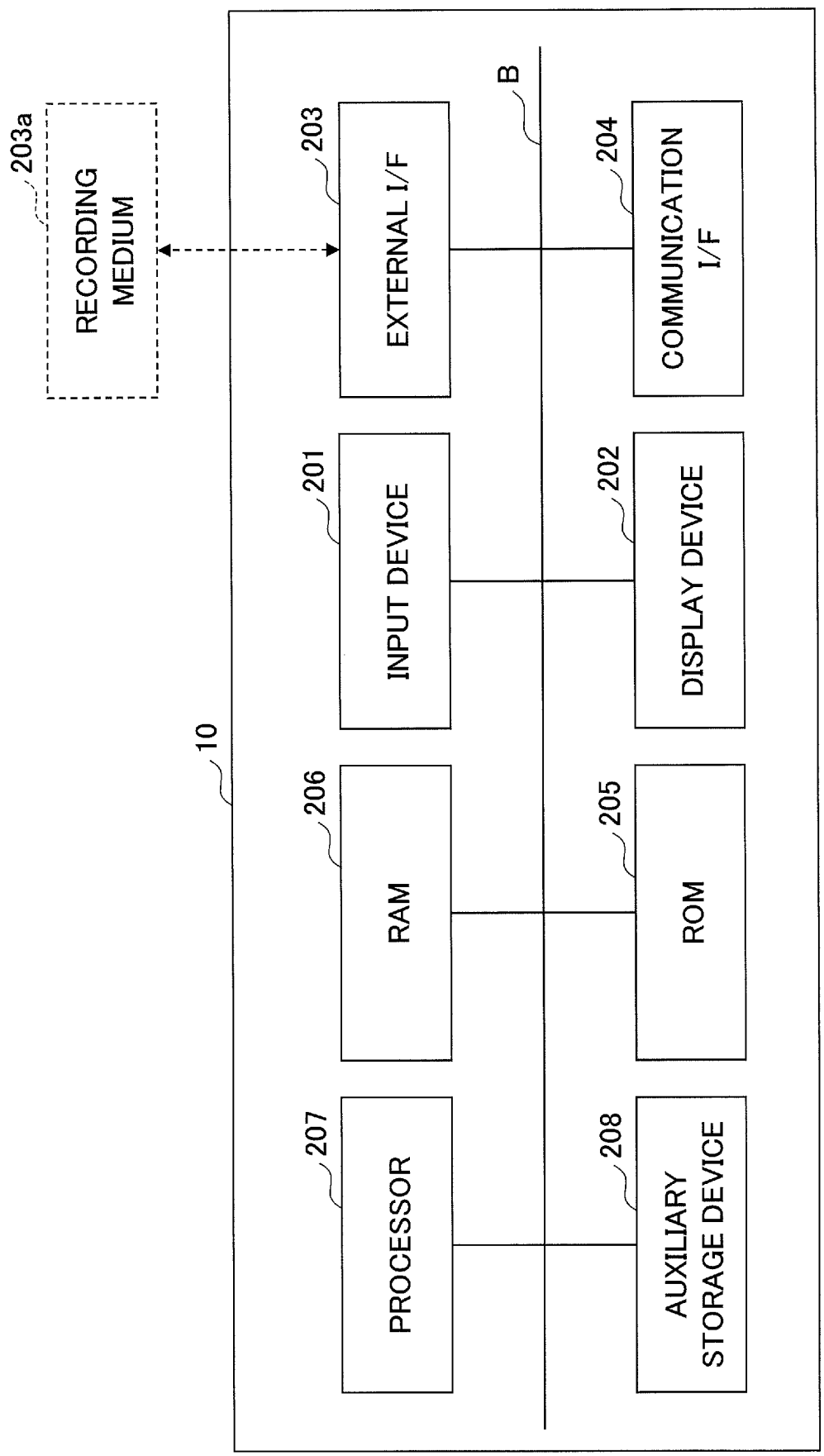
FIG. 10 is a diagram illustrating an example of a hardware configuration of the control device according to the present embodiment.

Next, the hardware configuration of the control device 10 according to the present embodiment will be described with reference to FIG. 10. FIG. 10 is a diagram illustrating an example of a hardware configuration of the control device 10 according to the present embodiment.

As illustrated in FIG. 10, the control device 10 according to the present embodiment includes an input device 201, a display device 202, an external I/F 203, a communication I/F 204, a ROM (Read Only Memory) 205, a RAM 206, a processor 207, and an auxiliary storage device 208. Each of these hardware elements is interconnected via a bus B.

The input device 201 is, for example, a button of various types, a touch panel, a keyboard, a mouse, or the like, and is used to input various operations to the control device 10. The display device 202 is, for example, a display for displaying various processing results performed by the control device 10. The control device 10 is not required to include both the input device 201 and the display device 202.

The external I/F 203 is an interface with an external device. An example of the external device includes a recording medium 203a. The control device 10 can read from and write to the recording medium 203a through the external I/F 203. An example of the recording medium 203a includes an SD memory card, a USB memory, a CD (Compact Disc), and a DVD (Digital Versatile Disc). One or more programs realizing each of the functional units provided by the control device 10 may be stored in the recording medium 203a.

The communication I/F 204 is an interface for the control device 10 to perform data communication with other devices. One or more programs realizing each of the functional units of the control device 10 may be acquired (downloaded) from a given server or the like through the communication I/F 204.

The ROM 205 is a non-volatile semiconductor memory that can retain data even in a case of power-off. The RAM 206 is a volatile semiconductor memory that temporarily retains programs and data.

The processor 207 is, for example, a CPU (central processing unit) or a GPU (Graphics Processing Unit), and the processor 207 is an arithmetic operating unit that loads programs and data from the auxiliary storage device 208 or the ROM 205 into the RAM 206, and that performs various processing. The control device 10 may include only either the CPU or the GPU as the processor 207, or may include both the CPU and the GPU.

The auxiliary storage device 208 is non-volatile memory that stores programs or data. An example of the auxiliary storage device 208 includes an HDD (Hard Disk Drive) or an SSD (Solid State Drive). The programs and data stored in the auxiliary storage device 208 include, for example, one or more programs for realizing each of the functional units of the control device 10, an operating system (OS) which is basic software, and various application programs which run on the OS.

Because the control device 10 according to the present embodiment has the hardware configuration illustrated in FIG. 10, various processes described above can be realized. FIG. 10 illustrates an example of a hardware configuration in which the control device 10 is implemented by a single computer. However, the control device 10 may be implemented by multiple computers.

[Practical Example]

Next, a practical example of the present embodiment will be described. In the following examples, a technique implemented in the control device 10 according to the present embodiment (hereinafter referred to as a "present method" in the examples) was compared with general techniques. The general techniques that were compared with the present method are a proportional method and a proportional differential method.

In the proportional method, a look-ahead operation of a target value is not performed. In the proportional method, a difference between the target value r(t) and the current process value $y_0$ is calculated (which is referred to as a target value deviation e(t)). Also, the target value deviation e(t) is used as the state s(t) as it is, and calculation of the amount of operation change du(t) and deep reinforcement learning are performed by using the s(t) (that is the e(t)).

In the proportional differential method, a look-ahead operation of a target value is not performed. In the proportional differential method, a difference between the target value r(t) and the current process value $y_0$ is calculated (which is referred to as a target value deviation e(t)), and the time derivative d(e(t))/dt of the target value deviation e(t) is further calculated. Then, the target value deviation e(t) and its time derivative d(e(t))/dt are used as the state s(t) to calculate the amount of operation change du(t) and to conduct deep reinforcement learning.

Figure 11:
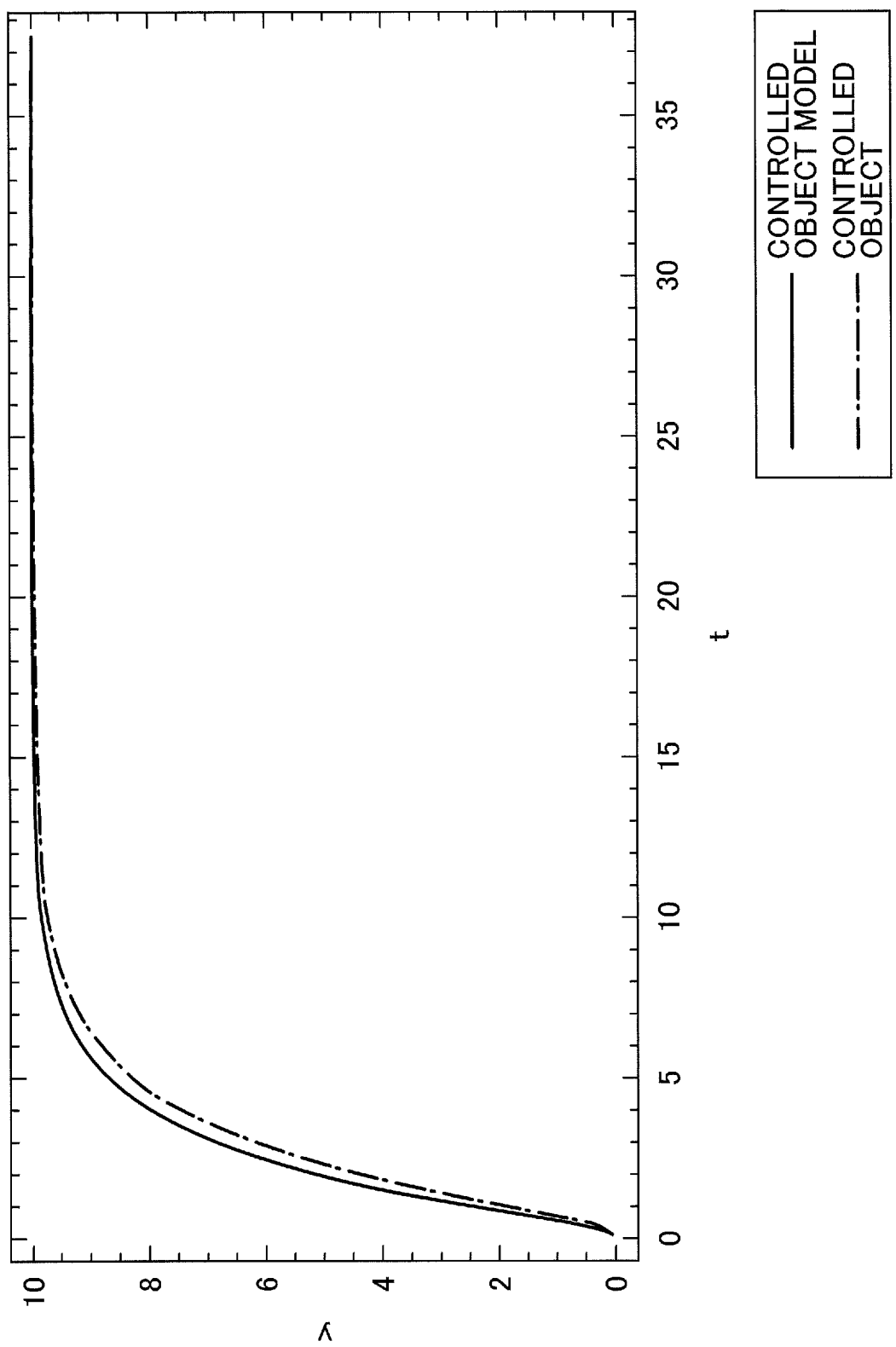
FIG. 11 is a diagram illustrating a step response in a practical example.

In the practical example, the controlled object model 20 and the controlled object 30 having step response characteristics illustrated in FIG. 11 are used. As illustrated in FIG. 11, in the practical example, there is a difference between the step response of the controlled object model 20 and the step response of the controlled object 30.

In the practical example, the operation amount u(t) takes one of discrete values of +1, 0, and −1. That is, u(t) is expressed by the following expression:

$$u(t) = \begin{cases} 1 \\ 0 \\ -1 \end{cases} \quad \text{(Formula 10)}$$

This case can be seen in various industrial fields, such as ON/OFF control of heaters in temperature control, a two-level inverter, a three-level inverter, heating/cooling control in a chemical plant, A/D conversion in signal processing, and the like. Note that it is possible to learn continuous values depending on a method of deep reinforcement learning. If such a method is employed, the operation amount u(t) may be a continuous value.

Generally, when handling a case such as the practical example by using model predictive control, a discrete time series optimization problem in a prediction horizon needs to be solved. Such an optimization problem is called an integer programming problem and is a computationally time-consuming problem. Further, when relatively simple control such as PID control is used, discretization of continuous values is required, and accuracy of control varies depending on the modulation period, so that it is difficult to adjust the accuracy.

Figure 12:
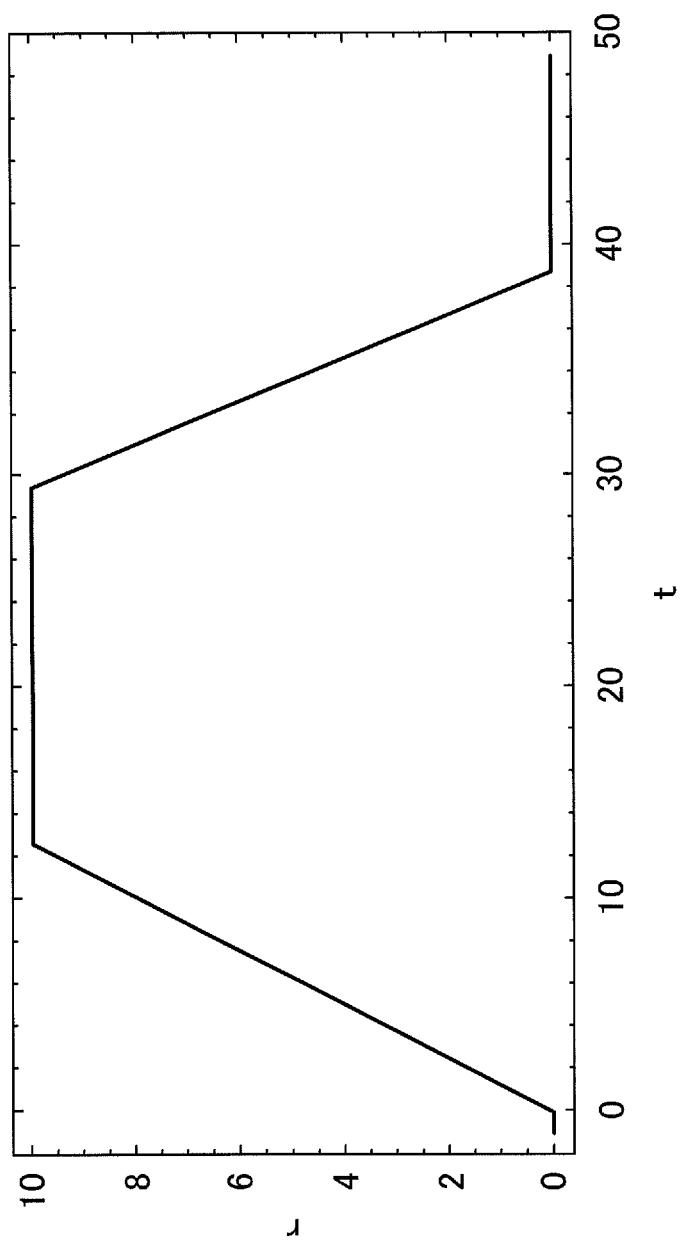
FIG. 12 is a diagram illustrating a target value time series for training in the practical example.

In the practical example, the target value time series {r(t)} that is used during training is illustrated in FIG. 12. As illustrated in FIG. 12, the target value time series {r(t)} is represented by a trapezoidal shape. As control parameters, the control cycle $T_c=1$, the model interval K=300, and the look-ahead length $T_p=2$ were used.

With respect to learning conditions for deep reinforcement learning, the following conditions were used.

Action selection parameter ε=0.3
Discount factor γ=0.95
Action set={0, 1, 2}
Amount of training (number of episodes)=200
Parameters for a neural network: number of cells=50, number of layers=3, dimensions of input/output=1×3 (present method), 1×3 (proportional method), and 2×3 (proportional differential method)

In the present method, because only the adjusted target value deviation e* is used for an input of the neural network, a size of the neural network of the present method becomes smaller than that of the proportional differential method.

Figure 13:
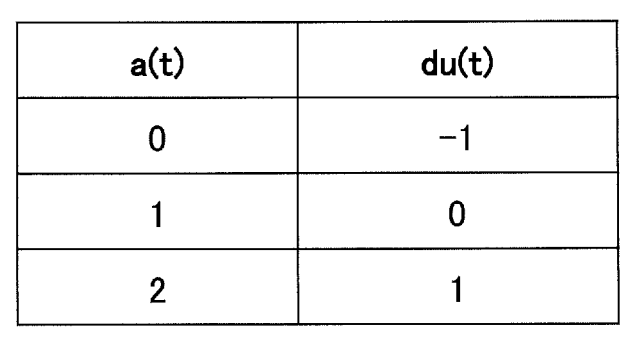

Also, the action/operation change amount conversion unit 124 converts the action a(t), which takes one value in the action set {0, 1, 2}, to the operation change amount du(t), by using the conversion table illustrated in FIG. 13. In the practical example, since the possible values of the operation amount u(t) are −1, 0, and 1, a limiter is additionally provided so that the operation amount u(t) does not deviate from a range of the possible values because of the operation change amount du(t).

The reward calculation unit 121 calculates the reward R(t) in accordance with the following formulas.

Figure 14A:
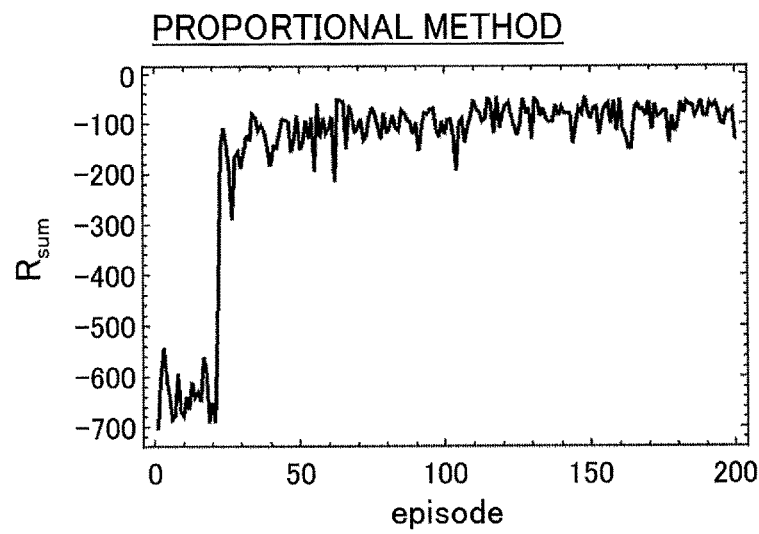
FIGS. 14A to 14C are diagrams illustrating learning curves in the practical example.
Figure 14B:
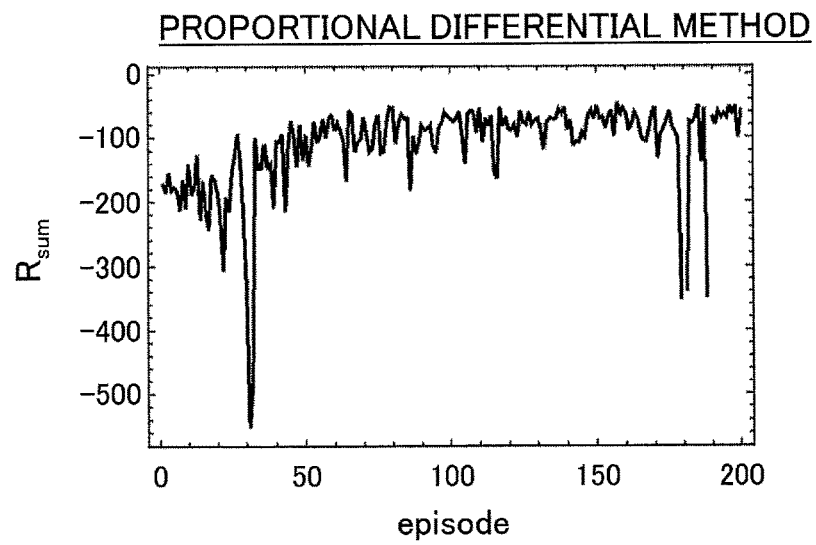
Figure 14C:
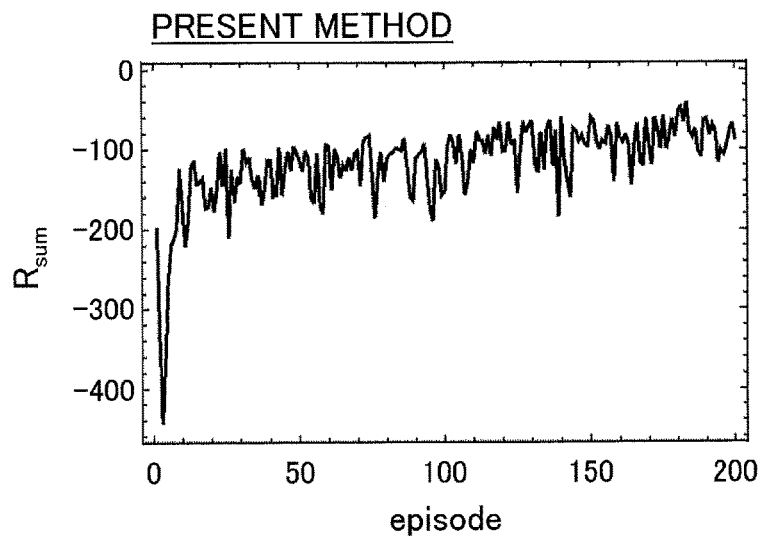

Present method: $R(t)=-|e^*(t)|$
Proportional method: $R(t)=-|e(t)|$
Proportional differential method: $R(t)=-|e(t)|$ Learning curves of the present method, the proportional method, and the proportional differential method (i.e., change in total reward for each episode) under the above-described conditions are illustrated in FIGS. 14A to 14C. If one episode is defined as t=0 to t=50, the total reward $R_{sum}$ is calculated as follows.

$$R_{sum} = \sum_{t=0}^{50} R(t) \qquad \text{(Formula 11)}$$

As illustrated in FIGS. 14A to 14C, in all of the proportional method, the proportional differential method, and the present method, the total reward $R_{sum}$ increases as the episode proceeds. However, in the present method, the total reward $R_{sum}$ tends to converge at an early stage as compared to the proportional method and the proportional differential method. Accordingly, the present method achieves more efficient learning compared with the proportional method and the proportional differential method.

Figure 15A:
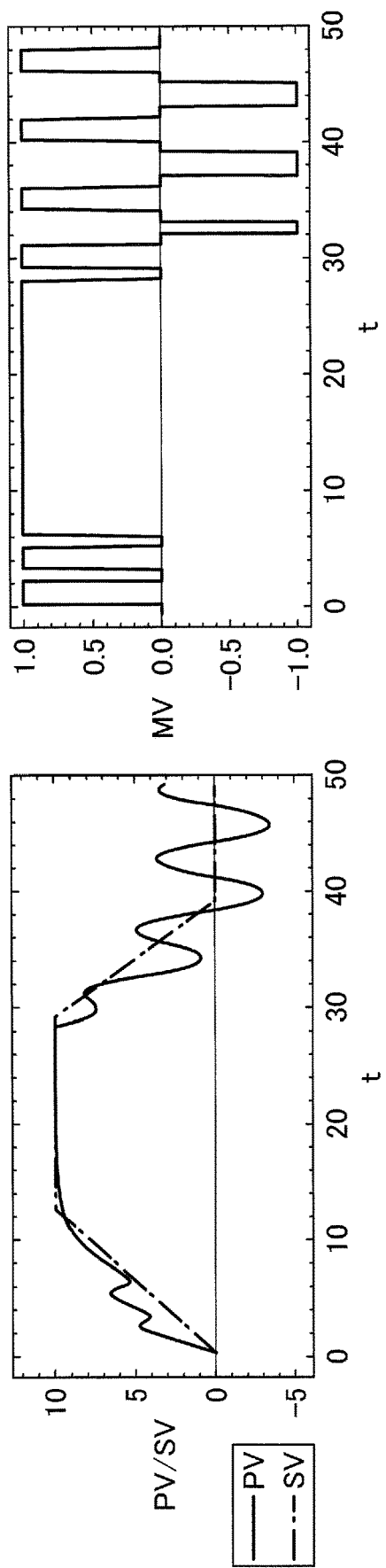
FIGS. 15A to 15C are a first set of diagrams illustrating a control response result in the practical example.
Figure 15B:
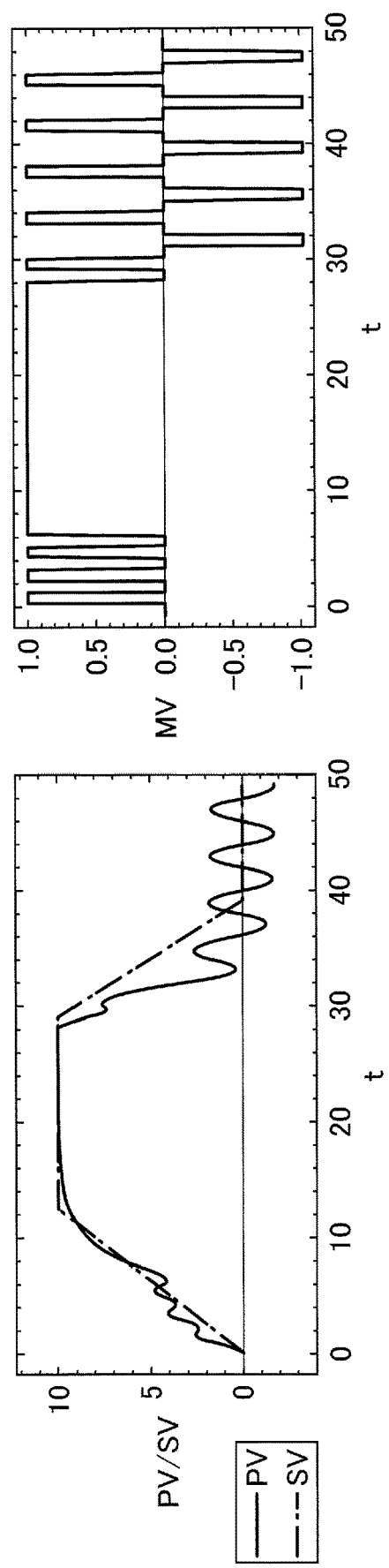
Figure 15C:
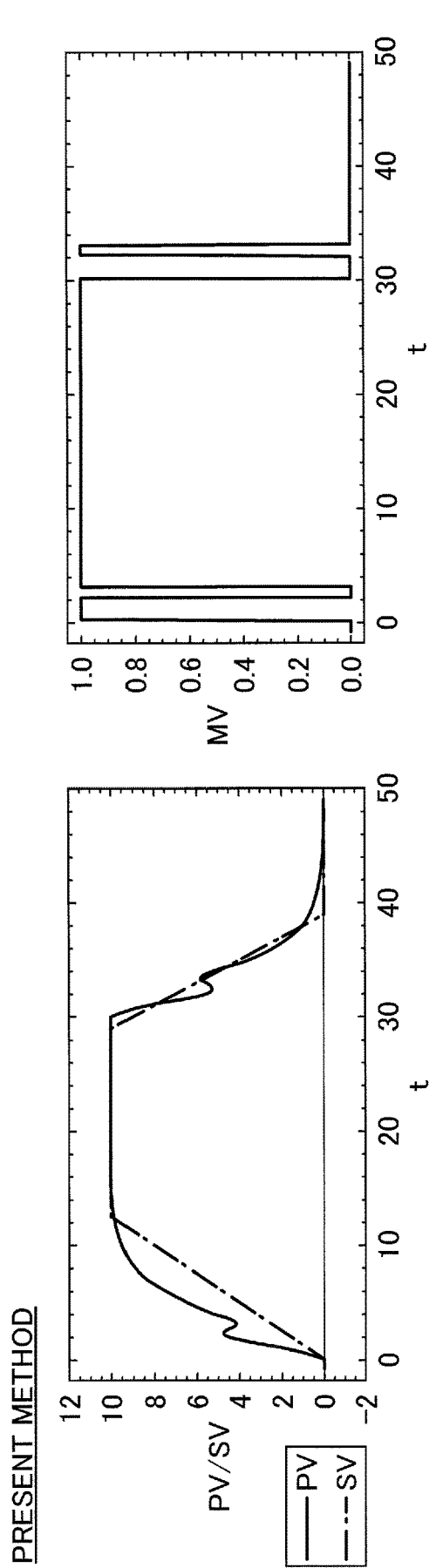

Next, FIGS. 15A to 15C illustrate results of control response when the target value time series {r(t)} illustrated in FIG. 12 is used (that is, when the target value time series {r(t)} used for training is used) for each of the present method, the proportional method, and the proportional differential method after training is completed.

As illustrated in FIG. 15A, in the proportional method, a difference between the PV and the SV (target value deviation) is particularly large and oscillatory in the latter half (time t=30 and later). In the differential proportional method, as illustrated in FIG. 15B, a target value deviation in the latter half is improved as compared to the proportional method, but the response remains oscillatory.

On the other hand, in the present method, as illustrated in FIG. 15C, control (tracking) in the latter half is very smooth, and little oscillating response can be seen. Thus, excellent control is realized. This is because, in the present method, effect of prediction of control response based on the controlled object model 20 is considered.

Figure 16A:
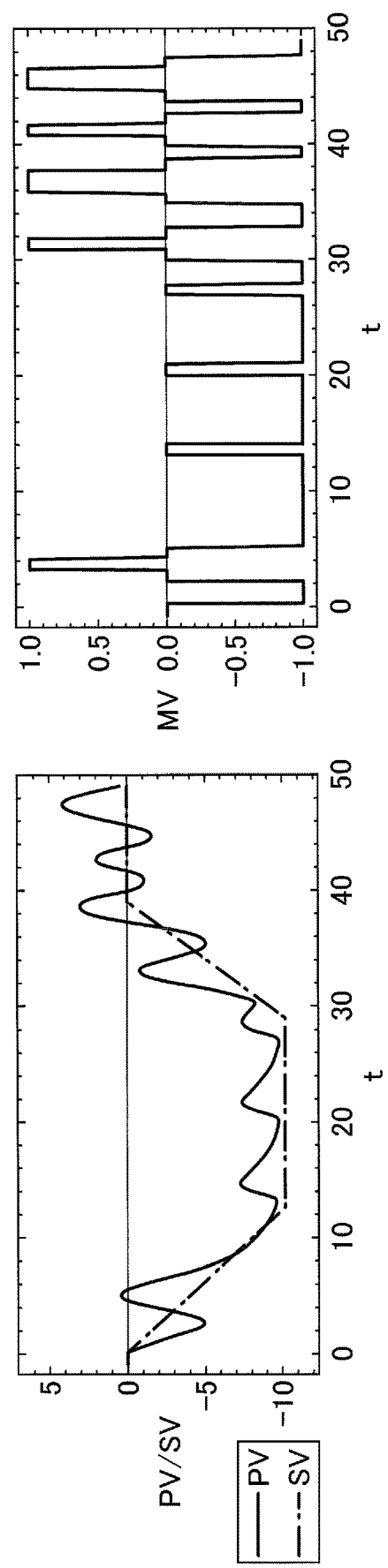
FIGS. 16A to 16C are a second set of diagrams illustrating the control response result in the practical example.
Figure 16B:
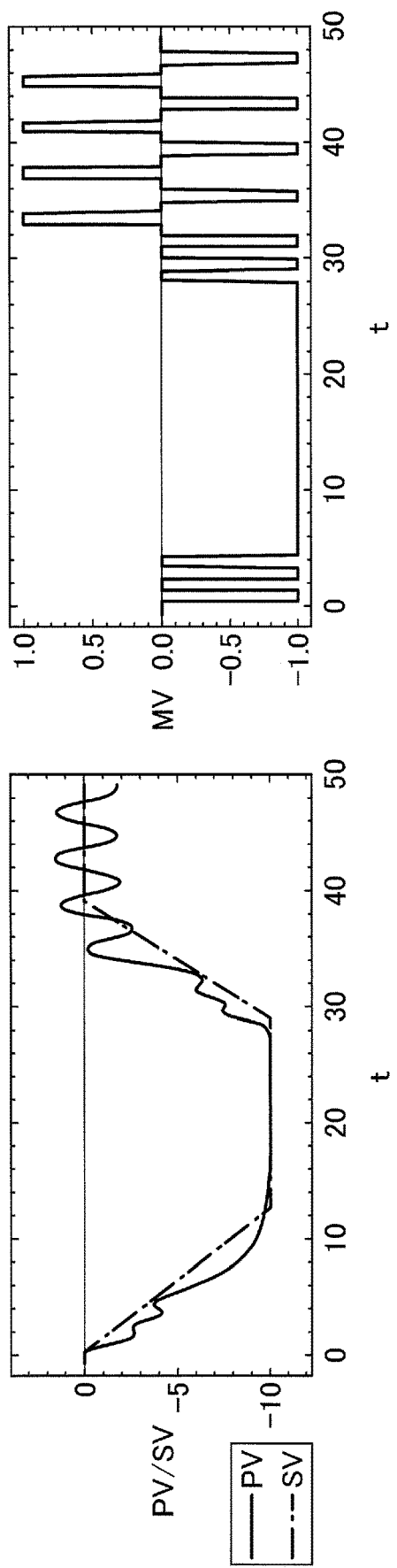
Figure 16C:
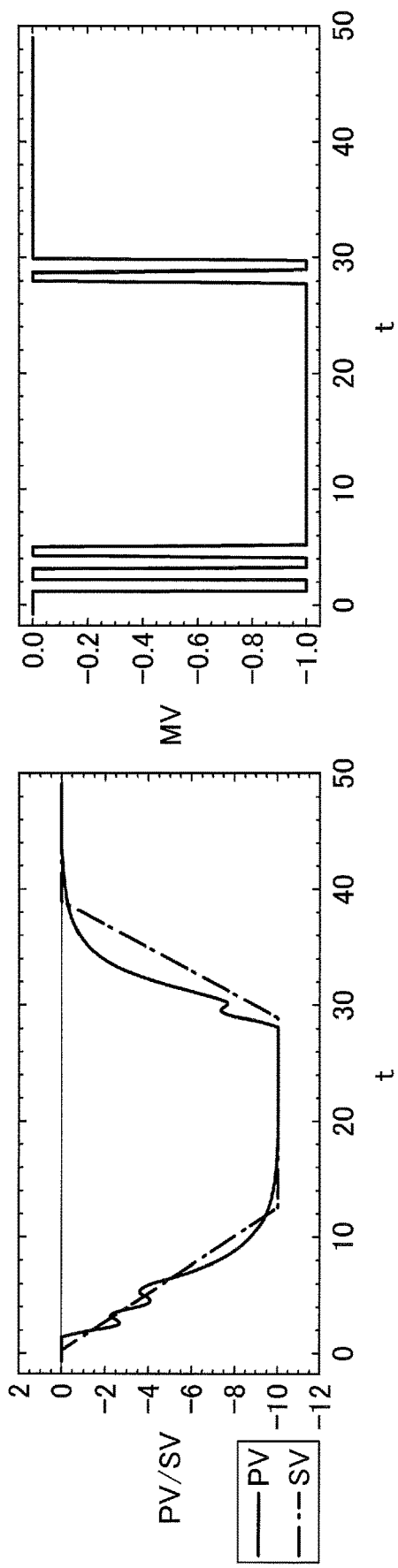

Next, results of control response when a target value time series {r(t)} different from the target value time series {r(t)} illustrated in FIG. 12 is used for each of the present method, the proportional method, and the proportional differential method after training is completed is illustrated in FIGS. 16A to 16C. In the example illustrated in FIGS. 16A to 16C, as a target value time series {r(t)} different from the target value time series {r(t)} illustrated in FIG. 12, a target value time series {r(t)}, in which a sign of the target value time series {r(t)} illustrated in FIG. 12 is inverted, is used.

As illustrated in FIG. 16A, in the proportional method, a target value deviation is large and response is oscillatory even in the first half and the middle section, as compared to FIG. 15A. As illustrated in FIG. 16B, the proportional differential method is almost equivalent to that in FIG. 15B, but response slightly deteriorates as compared with FIG. 15B.

On the other hand, in the present method, as illustrated in FIG. 16C, there is little oscillating response and good control can be achieved. This is because effective learning is realized due to small I/O dimensionality of a neural network for learning and general-purpose learning is possible due to the adjusted target value deviation.

As described above, in the control device 10 according to the present embodiment, even in a discrete operation amount control problem that is difficult to handle by using a conventional control method (such as model predictive control), by combining the adjusted target value deviation calculated by the controlled object model with deep reinforcement learning, it is possible to efficiently perform training with a small number of state variables and to achieve good control with small amount of oscillation.

The present invention is not limited to the above specifically disclosed embodiments, and various modifications and enhancements can be made without departing from the scope of the claims.

What is claimed is:

1. A control device for outputting an operation amount of a controlled object so as to cause a process value of the controlled object to track a target value, the control device comprising:
a target value look-ahead unit configured, in response to receiving a time series of target values and a look-ahead length, to acquire a look-ahead target value from among the target values included in the time series, the look-ahead target value being a target value after a lapse of time corresponding to the look-ahead length;
a look-ahead target value deviation calculating unit configured to calculate a look-ahead target value deviation, which is a difference between the look-ahead target value and a current process value of the controlled object, the current process value being obtained from the controlled object or from a controlled object model made by modelling the controlled object;
an adjusted target value deviation calculating unit configured to calculate an adjusted target value deviation, by adjusting the look-ahead target value deviation to a difference between the look-ahead target value and a predicted value of the process value after the lapse of time corresponding to the look-ahead length, based on a response model of the controlled object and a change amount of the operation amount from a past to a current time; and
an operation amount calculation unit configured to perform reinforcement learning based on the adjusted target value deviation, and to calculate an updated operation amount based on the adjusted target value deviation.

2. The control device according to claim 1, wherein the operation amount calculation unit includes
a reward calculation unit configured, in response to receiving an input of the adjusted target value deviation, to calculate a reward by using the adjusted target value deviation;
a reinforcement learning unit configured to perform reinforcement learning by using a state variable including the adjusted target value deviation and by using the reward, and to output an action corresponding to the state variable; and
a conversion unit configured to convert the action into a change amount of the operation amount; and the operation amount calculation unit is configured to calculate the updated operation amount by adding, to a current operation amount, the change amount obtained by the conversion unit.

3. The control device according to claim 2, wherein the reinforcement learning unit is configured to perform reinforcement learning by updating an action-value function implemented by a neural network.

4. The control device according to claim 2, wherein the action is represented by a discrete value.

5. The control device according to claim 4, wherein the conversion unit is configured to convert the action into the change amount of the operation amount, by using a predetermined function outputting the change amount of the operation amount in response to the action being input, or by using a table recording a mapping between the action and the change amount of the operation amount.

6. The control device according to claim 2, wherein the reward calculated by the reward calculation unit is one of a value obtained by multiplying −1 by the adjusted target value deviation, a value obtained by multiplying −1 by a square of the adjusted target value deviation, and an output of a predetermined function receiving an input of the adjusted target value deviation.

7. The control device according to claim 1, wherein the response model is a mathematical expression for calculating a process value of a future time from a time series of past change amounts of the operation amount, and the mathematical expression is one of a linear predictive function, a nonlinear predictive function, and a function implemented by a neural network.

8. The control device according to claim 7, further comprising a predicted time series storage unit configured to store a time series of predicted results of the process value that are obtained by the mathematical expression; wherein the adjusted target value deviation calculating unit is configured to calculate the adjusted target value deviation by using the predicted results stored in the predicted time series storage unit.

9. A method performed by a control device for outputting an operation amount of a controlled object so as to cause a process value of the controlled object to track a target value, the method comprising:
in response to receiving a time series of target values and a look-ahead length, acquiring a look-ahead target value from among the target values included in the time series, the look-ahead target value being a target value after a lapse of time corresponding to the look-ahead length;
calculating a look-ahead target value deviation, which is a difference between the look-ahead target value and a current process value of the controlled object, the current process value being obtained from the controlled object or from a controlled object model made by modelling the controlled object;
calculating an adjusted target value deviation, by adjusting the look-ahead target value deviation to a difference between the look-ahead target value and a predicted value of the process value after the lapse of time corresponding to the look-ahead length, based on a response model of the controlled object and a change amount of the operation amount from a past to a current time;
performing reinforcement learning based on the adjusted target value deviation; and
calculating an updated operation amount based on the adjusted target value deviation.

10. A non-transitory recording medium storing a computer program to cause a computer to perform a method for outputting an operation amount of a controlled object, to cause a process value of the controlled object to track a target value, the method comprising:
in response to receiving a time series of target values and a look-ahead length, acquiring a look-ahead target value from among the target values included in the time series, the look-ahead target value being a target value after a lapse of time corresponding to the look-ahead length;
calculating a look-ahead target value deviation, which is a difference between the look-ahead target value and a current process value of the controlled object, the current process value being obtained from the controlled object or from a controlled object model made by modelling the controlled object;
calculating an adjusted target value deviation, by adjusting the look-ahead target value deviation to a difference between the look-ahead target value and a predicted value of the process value after the lapse of time corresponding to the look-ahead length, based on a response model of the controlled object and a change amount of the operation amount from a past to a current time;
performing reinforcement learning based on the adjusted target value deviation; and
calculating an updated operation amount based on the adjusted target value deviation.

\* \* \* \* \*